(12) United States Patent
Kondo

(10) Patent No.: US 10,574,896 B2
(45) Date of Patent: Feb. 25, 2020

(54) IMAGING CONTROL APPARATUS AND METHOD FOR CONTROLLING THE SAME

(71) Applicant: CANON KABUSHIKI KAISHA, Tokyo (JP)

(72) Inventor: Emi Kondo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 40 days.

(21) Appl. No.: 15/847,467

(22) Filed: Dec. 19, 2017

(65) Prior Publication Data

US 2018/0184008 A1    Jun. 28, 2018

(30) Foreign Application Priority Data

Dec. 27, 2016 (JP) ................... 2016-254227

(51) Int. Cl.
    *H04N 5/232*    (2006.01)
(52) U.S. Cl.
    CPC ..... *H04N 5/23293* (2013.01); *H04N 5/23216* (2013.01)
(58) Field of Classification Search
    CPC ......... H04N 5/23293; H04N 5/232935; H04N 5/232939; H04N 5/23216
    See application file for complete search history.

(56) References Cited

U.S. PATENT DOCUMENTS

| | | | |
|---|---|---|---|
| 8,208,056 B2 | 6/2012 | Fujio et al. | |
| 8,704,856 B2 | 4/2014 | Misawa et al. | |
| 9,001,255 B2 | 4/2015 | Matsuzawa et al. | |
| 9,323,432 B2 | 4/2016 | Kang et al. | |
| 10,015,404 B2 | 7/2018 | Hara | |
| 2005/0219393 A1 | 10/2005 | Sugimoto | |
| 2007/0242143 A1 | 10/2007 | Sugimoto | |
| 2007/0285534 A1 | 12/2007 | Makioka | |
| 2008/0025712 A1 | 1/2008 | Furuya | |
| 2009/0153722 A1 | 6/2009 | Fujio et al. | |
| 2012/0229675 A1 | 9/2012 | Yamamoto | |
| 2013/0155308 A1 | 6/2013 | Wu et al. | |
| 2013/0300674 A1 | 11/2013 | Davidson | |
| 2014/0160233 A1 | 6/2014 | Ishida | |
| 2015/0264253 A1 | 9/2015 | Takagi | |

(Continued)

FOREIGN PATENT DOCUMENTS

| | | |
|---|---|---|
| JP | 2012-060567 A | 3/2012 |
| JP | 2016-163104 A | 9/2016 |

*Primary Examiner* — Yogesh K Aggarwal
(74) *Attorney, Agent, or Firm* — Canon U.S.A., Inc. IP Division

(57) ABSTRACT

In order to allow a user to easily confirm whether an image was captured with a camera orientation adjusted as intended, an imaging control apparatus includes a display control unit configured to perform control to present a 2-area enlargement display of displaying live view images captured by two imaging regions in an imaging unit that are separated in a width direction or a height direction while juxtaposing them on a display unit, and a control unit configured to perform control to, after an image is captured according to an imaging instruction issued while the live view images in the 2-area enlargement display are displayed, present a review display of a 2-area enlargement of displaying two regions of the captured image that are separated in the width direction or the height direction while juxtaposing them on the display unit.

29 Claims, 9 Drawing Sheets

(56) References Cited

U.S. PATENT DOCUMENTS

| | | |
|---|---|---|
| 2016/0044235 A1 | 2/2016 | Cho et al. |
| 2016/0295130 A1 | 10/2016 | Mølgaard et al. |
| 2017/0034428 A1* | 2/2017 | Kwon .................. G06F 3/04817 |
| 2017/0034449 A1 | 2/2017 | Eum et al. |
| 2017/0054913 A1* | 2/2017 | Hara .................. H04N 5/23293 |
| 2017/0183996 A1 | 6/2017 | Baker et al. |
| 2017/0199620 A1 | 7/2017 | Ishitsuka |
| 2017/0278217 A1 | 9/2017 | Takahashi |
| 2017/0318226 A1 | 11/2017 | Jung et al. |
| 2018/0013957 A1 | 1/2018 | Irie et al. |
| 2018/0183996 A1 | 6/2018 | Takahashi |
| 2018/0234630 A1 | 8/2018 | Kondo |

* cited by examiner

US 10,574,896 B2

IMAGING CONTROL APPARATUS AND METHOD FOR CONTROLLING THE SAME

BACKGROUND OF THE INVENTION

Field of the Invention

The present disclosure relates to, for example, a technique for displaying a live view image while enlarging a part thereof.

Description of the Related Art

When a camera is used, it may be desirable to capture an image while holding the camera horizontally in some cases. When, for example, a building or a scenery is imaged, failing to keep the camera horizontal results in a tilt of the captured image, thereby causing an awkward result. To solve this issue, Japanese Patent Application Laid-Open No. 2012-060567 discusses a method for detecting an orientation of the camera based on a direction of gravitational force that is detected by an acceleration sensor, and displaying a level display indicating the detected orientation of the camera together with a live-view image. Further, Japanese Patent Application Laid-Open No. 2016-163104 discusses a method for displaying images generated by enlarging two regions separated in a left/right direction on a live view image, respectively, side by side, thereby allowing a user to achieve accurate horizontal alignment by visual confirmation.

A blur and/or a vibration may occur at the time of the imaging due to causes such as a force operating a shutter button, a camera shake, and a vibration of a shutter or a mirror. This may cause the image to be captured while the horizontal orientation of the camera that has been adjusted before the imaging fails to be maintained. However, according to the above-described Japanese Patent Application Laid-Open No. 2012-060567 and Japanese Patent Application Laid-Open No. 2016-163104, the user cannot confirm the horizontal orientation of the camera that has been adjusted at the time of the imaging after the imaging, thereby having difficulty in determining whether the image was captured with the intended orientation.

SUMMARY OF THE INVENTION

The present disclosure is directed to an imaging control apparatus and an imaging control method capable of allowing the user to further easily confirm whether the image was captured with the camera orientation adjusted as intended.

According to an aspect of the present disclosure, an imaging control apparatus includes a display control unit configured to perform control to present a 2-area enlargement display of displaying live view images captured at two imaging regions of an imaging unit that are separated in a width direction or a height direction while juxtaposing them on a display unit, and a control unit configured to perform control to, after an image is captured according to an imaging instruction issued while the live view images in the 2-area enlargement display are displayed, present a review display of a 2-area enlargement of displaying two regions of the captured image that are separated in the width direction or the height direction while juxtaposing them on the display unit.

Further features of the present disclosure will become apparent from the following description of exemplary embodiments with reference to the attached drawings.

DESCRIPTION OF THE EMBODIMENTS

An exemplary embodiment of the present disclosure will be described in detail below with reference to the accompanying drawings.

It is to be noted that the following exemplary embodiment is merely one example for implementing the present disclosure and can be appropriately modified or changed depending on individual constructions and various conditions of apparatuses to which the present disclosure is applied. Thus, the present disclosure is in no way limited to the following exemplary embodiment.

Figure 1A:
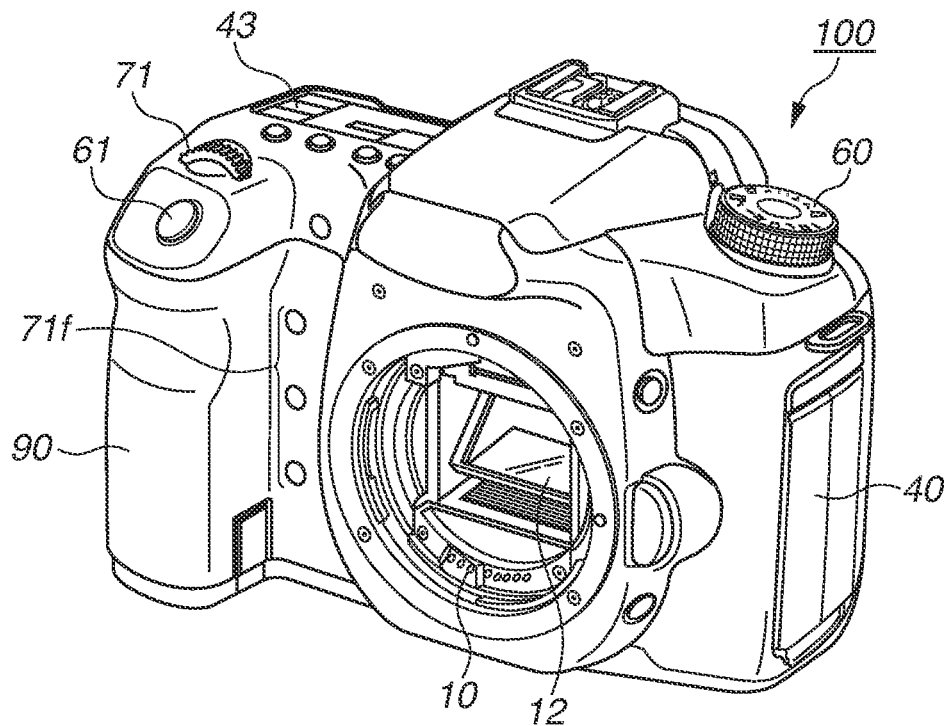
FIGS. 1A and 1B illustrate an external appearance of a digital camera.
Figure 1B:
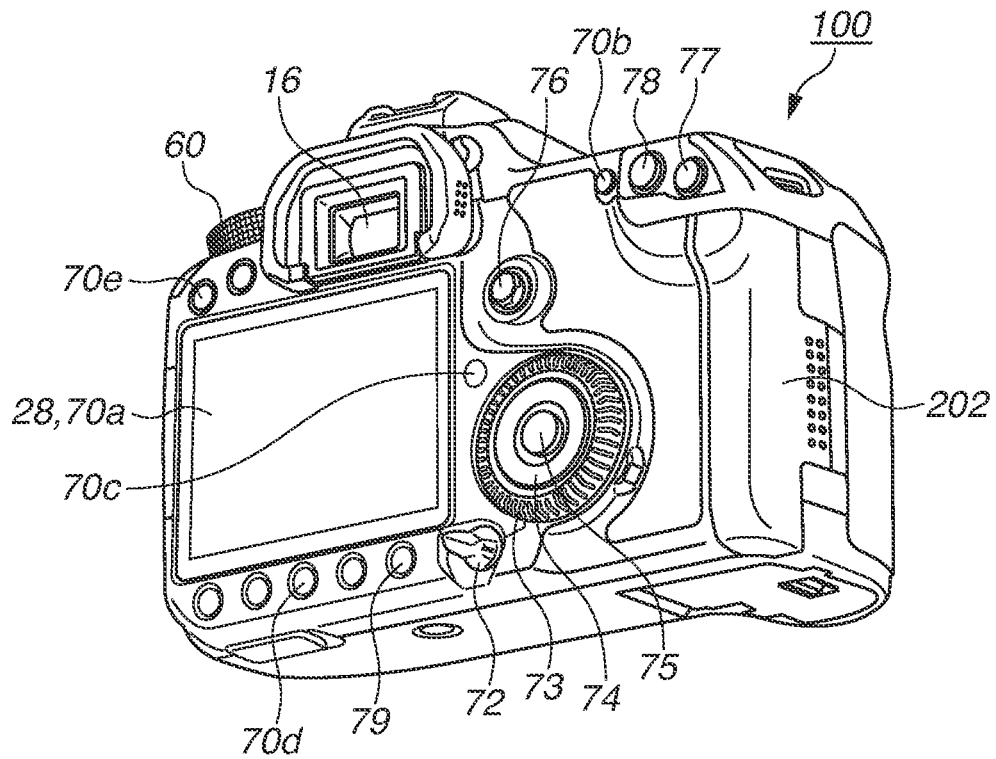

FIGS. 1A and 1B illustrate an external appearance of a digital camera 100 as one example of an apparatus to which the present disclosure can be applied. FIG. 1A is a perspective view of a front side of the digital camera 100, and FIG. 1B is a perspective view of a back side of the digital camera 100. In FIGS. 1A and 1B, a display unit 28 is a display unit provided on the back side of the digital camera 100 for displaying an image and various kinds of information. An out-finder display unit 43 is a display unit provided on a top surface of the camera 100, and displays various setting values of the camera 100 including a shutter speed and an aperture. A shutter button 61 is an operation member for issuing an imaging instruction. A mode selection switch 60 is an operation member for switching various kinds of modes. A terminal cover 40 is a cover for protecting a terminal (not illustrated) to which a connector of a connection cable used for connecting an external apparatus to the digital camera 100 is attached. A main electronic dial 71 is a rotational operation member included in an operation unit 70, and a user can, for example, change the setting values, such as the shutter speed and the aperture value, by rotating this main electronic dial 71. A power switch 72 is an operation member for switching a power source of the digital camera 100 to ON or OFF. A sub electronic dial 73 is included in the operation unit 70, and is a rotational operation member included in the operation unit 70. The sub electronic dial 73 allows the user to, for example, move a selection frame and skip to a subsequent image (image forwarding operation). A cross key 74 is included in the operation unit 70, and is a cross key (a four-directional key) including an up portion, a down portion, a left portion, and a right portion that can be individually pressed. The cross key 74 allows the user to perform an operation according to the pressed portion. A SET button 75 is included in the operation unit 70, and is a pressing button. The SET button 75 is mainly used to, for example, determine a selected item. A live view (LV) button 76 is included in the operation unit 70, and is a button for switching a live view (hereinafter referred to as an LV) to ON or OFF in a still image capturing mode. The LV button 76 is used to instruct the digital camera 100 to start or stop capturing (recording) a moving image in a moving image capturing mode. An enlargement button 77 is included in the operation unit 70, and is an operation button for switching an enlargement mode to ON or OFF in a live view display in an imaging mode, and changing an enlargement ratio in an enlargement mode. The enlargement button 77 functions as an enlargement button for enlarging a playback image and increasing the enlargement ratio in a playback mode. A reduction button 78 is included in the operation unit 70, and is a button for reducing the enlargement ratio of the enlarged playback image to reduce the size of the displayed image. A playback button 79 is included in the operation unit 70, and is an operation button for switching the imaging mode and the playback mode. Pressing the playback button 79 while the digital camera 100 is in the imaging mode causes the digital camera 100 to transition to the playback mode, and allows the digital camera 100 to display the latest image among images recorded in a recording medium 200 on the display unit 28. A quick-return mirror 12 is instructed by a system control unit 50 to be flipped up and down by an actuator (not illustrated). A communication terminal 10 is a communication terminal used for the digital camera 100 to communicate with a lens side (attachable to and detachable from the digital camera 100). An eyepiece finder 16 is a finder configured to be looked into, which is usable to confirm a focus and a composition of an optical image of a subject that is acquired via a lens unit 150 by observing a focusing screen 13. A cover 202 is a cover of a slot where the recording medium 200 is stored. A grip portion 90 is a holding portion shaped so as to allow the user to easily grip it with the user's right hand when holding the digital camera 100.

Figure 2:
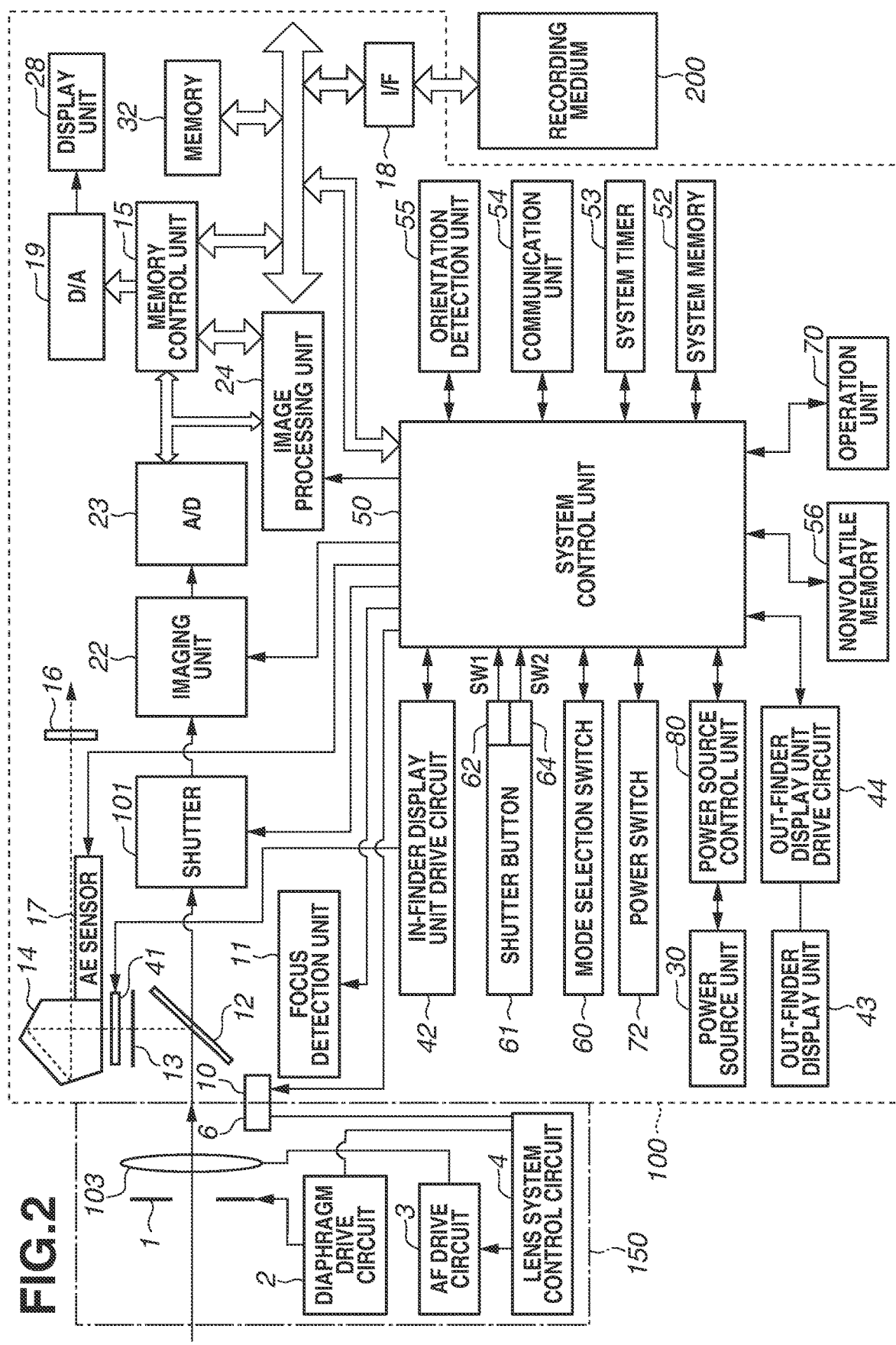
FIG. 2 is a block diagram illustrating a configuration of the digital camera.

FIG. 2 is a block diagram illustrating an example of a configuration of the digital camera 100 according to the present exemplary embodiment.

In FIG. 2, the lens unit 150 is a lens unit with a replaceable imaging lens mounted thereon.

A lens 103 is normally formed of a plurality of lenses, but is illustrated as being only one lens in FIG. 2 for the purpose of simplification. A communication terminal 6 is a communication terminal used for the lens unit 150 to communicate with the digital camera 100 side, and the communication terminal 10 is the communication terminal used for the digital camera 100 to communicate with the lens unit 150 side. The lens unit 150 allows the digital camera 100 to be focused by communicating with the system control unit 50 via these communication terminals 6 and 10, controlling a diaphragm 1 via a diaphragm drive circuit 2 by an internally provided lens system control circuit 4, and displacing a position of the lens 103 via an autofocus (AF) drive circuit 3.

An automatic exposure (AE) sensor 17 measures light to detect a luminance of the subject that is acquired via the lens unit 150.

A focus detection unit 11 outputs defocus amount information to the system control unit 50. The system control unit 50 controls the lens unit 150 based on this defocus amount information to conduct phase difference AF.

The quick-return mirror 12 (hereinafter referred to as mirror 12) is instructed by the system control unit to be flipped up and down by the actuator (not illustrated) at the time of an exposure, capturing an image for the live view, and capturing a moving image. The mirror 12 is a mirror for switching a light flux incident from the lens 103 between a finder 16 side and an imaging unit 22 side. The mirror 12 is disposed to reflect the light flux to guide the light flux to the finder 16 at a normal state. However, when the image is captured or the live view is displayed, the mirror 12 is flipped up so as to guide the light flux to the imaging unit 22, thereby being retracted from inside the light flux (mirror lock-up).

Further, the mirror 12 is configured as a half mirror at a central portion thereof so as to permit the light to be partially transmitted therethrough, and allows the light flux to be partially transmitted therethrough to be incident on the focus detection unit 11 for carrying out focus detection.

The user of the digital camera 100 can confirm the focus and the composition of the optical image of the subject acquired via the lens unit 150 by observing the focusing screen 13 via a pentaprism 14 and the finder 16.

A shutter 101 is a focal plane shutter capable of freely controlling an exposure time period of the imaging unit 22 under control by the system control unit 50.

The imaging unit 22 is an image sensor constituted with use of, for example, a charge coupled device (CCD) or complementary metal-oxide semiconductor (CMOS) element, which converts an optical image into an electric signal. An analog-to-digital (A/D) converter 23 converts an analog signal into a digital signal. The A/D converter 23 is used to convert an analog signal output from the imaging unit 22 into a digital signal.

An image processing unit 24 performs predetermined pixel interpolation, resizing processing such as a reduction, and color conversion processing on the data received from the A/D converter 23 or data from a memory control unit 15. Further, the image processing unit 24 performs predetermined calculation processing with use of the captured image data, and the system control unit 50 controls the exposure and ranging based on an acquired result of the calculation. Based on this control, the digital camera 100 performs AF processing, AE processing, and flash preliminary emission (hereinafter, referred to as EF) processing of the Through-The-Lens (TTL) method. The image processing unit 24 further performs predetermined calculation processing with use of the captured image data, and the digital camera 100 also performs automatic white balance (AWB) processing of the TTL method based on an acquired result of the calculation.

The output data from the A/D convertor 23 is written into a memory 32 via the image processing unit 24 and the memory control unit 15, or is directly written into the memory 32 via the memory control unit 15. The memory 32 stores the image data acquired by the imaging unit 22 and converted into the digital data by the A/D converter 23, and image data to be displayed on the display unit 28. The memory 32 has a storage capacity sufficient to store a predetermined number of still images, or a moving image and audio data for a predetermined time period.

Further, the memory 32 also serves as a memory for the image display (a video memory). A digital-to-analog (D/A) converter 19 converts the data for the image display that is stored in the memory 32 into an analog signal, and provides the converted data to the display unit 28. In this manner, the image data for the display that is written in the memory 32 is displayed by the display unit 28 via the D/A converter 19. The display unit 28 presents a display according to the analog signal from the D/A converter 19 on a display device, such as a liquid crystal display (LCD). The digital camera 100 can provide a function as an electronic viewfinder and realize a through-image display (live view display) by converting the digital signal that has been converted from the analog signal by the A/D converter 23 and then stored into the memory 23 into the analog signal by the D/A converter 19, sequentially transferring the analog signal to the display unit 28 to display the transferred analog signal.

A frame indicating a focusing point on which the autofocus is currently conducted (AF frame), an icon indicating a setting state of the camera 100, and the like are displayed on an in-finder liquid crystal display unit 41 via an in-finder display unit drive circuit 42.

The various setting values of the camera 100 including the shutter speed and the aperture value are displayed on the out-finder display unit 43 via an out-finder display unit drive circuit 44.

A nonvolatile memory 56 is an electrically erasable and recordable memory, and, for example, an electrically erasable programmable read only memory (EEPROM) is used as the nonvolatile memory 56. The nonvolatile memory 56 stores constants, programs, and the like for operating the system control unit 50. The programs described here refer to programs for performing various kinds of flowcharts that will be described below in the present exemplary embodiment.

The system control unit 50 is a control unit including at least one processor, and controls the entire digital camera 100. The system control unit 50 realizes each processing procedure in the present exemplary embodiment (described below) by executing the above-described programs recorded in the nonvolatile memory 56. The digital camera 100 further includes a system memory 52, and, for example, a random access memory (RAM) is used as the system memory 52. The constants and variables for operating the system control unit 50, the programs read out from the nonvolatile memory 56, and the like are loaded into the system memory 52. Further, the system control unit 50 also performs display control by controlling the memory 32, the D/A converter 19, the display unit 28, and the like.

A system timer 53 is a time measurement unit that measures a time period for use in various kinds of control, and a time of a built-in clock.

The mode selection switch 60, a first shutter switch 62, a second shutter switch 64, and the operation unit 70 are operation units for inputting various kinds of operation instructions to the system control unit 50.

The mode selection switch 60 switches an operation mode of the system control unit 50 to any of a still image recording mode, the moving image capturing mode, the playback mode, and the like. Modes contained in the still image recording mode include an automatic imaging mode, an automatic scene determination mode, a manual mode, an aperture priority mode (aperture value (Av) mode), and a shutter speed priority mode (time value (Tv) mode). Further, the modes contained in the still image recording mode include various kinds of scene modes each corresponding to an imaging setting prepared for each imaging scene, a program AE mode, a custom mode. The user can directly switch the operation mode to any of these modes with use of the mode selection switch 60. Alternatively, the user may first switch the digital camera 100 to a screen displaying a list of the imaging modes with use of the mode selection switch 60, and, after that, select any of the plurality of displayed modes and switch the operation mode with use of another operation member. Similarly, the moving image capturing mode may also include a plurality of modes.

The first shutter switch 62 is switched on halfway through an operation of the shutter button 61, which is an imaging operation member provided on the digital camera 100, i.e., switched on upon a so-called half-press of the shutter button 61 (a first operation/instruction to prepare to capture the image), and generates a first shutter switch signal SW1. In response to the first shutter switch signal SW1, the system control unit 50 starts an operation of imaging preparation processing, such as the AF processing, the AE processing, the AWB processing, and the EF processing.

The second shutter switch 64 is switched on upon completion of the operation of the shutter button 61, i.e., switched on upon a so-called full-press of the shutter button 61 (a second operation/instruction to capture the image), and generates a second shutter switch signal SW2. In response to the second shutter switch signal SW2, the system control unit 50 starts a series of imaging processing operations from reading out the signal from the imaging unit 22 to writing the image data into the recording medium 200.

The individual operation members of the operation unit 70 are appropriately assigned functions for each scene and work as various kinds of functional buttons, by, for example, execution of an operation for selecting various kinds of functional icons displayed on the display unit 28. Examples of the functional buttons include an end button, a return button, an image forwarding button, a jump button, a depth-of-field preview button, and an attribute change button. For example, when a menu button 70e is pressed, a menu screen where various kinds of settings can be made is displayed on the display unit 28. The user can intuitively make the various kinds of settings by using the menu screen displayed on the display unit 28, the "up, down, left, and right four-directional button" 74, and the SET button 75.

The operation unit 70 includes various kinds of operation members as an input unit that receives an operation from the user. The operation unit 70 includes at least the following operation units: the shutter button 61, the main electronic dial 71, the power switch 72, the sub electronic dial 73, the cross key 74, the SET button 75, the LV button 76, the enlargement button 77, the reduction button 78, and the playback button 79. The cross key 74 is a directional button that allows each of the up, down, right, and left portions of the cross key 74 to be pressed in. In the present exemplary embodiment, the cross key 74 has been described as an integrated operation unit, but each of the up button, the down button, the right button, and the left button may be an independent button. In the following description, the up or down portion, and the left or right portion will be referred to as an up/down key and a left/right key, respectively. Further, the operation unit 70 also includes the following operation units.

An AF-ON button 70b is a pressing button switch included in the operation unit 70, and the user can instruct the digital camera 100 to conduct the AF operation by pressing the AF-ON button 70b. The AF-ON button 70b is pressed in a direction parallel with a direction (optical axis) of subject light incident from the lens 103 on the imaging unit 22.

A quick setting button 70c (hereinafter referred to as a Q button 70c) is a pressing button switch included in the operation unit 70, and a quick setting menu, which is a list of setting items settable in each operation mode, is displayed by pressing the Q button 70c. For example, when the Q button 70c is pressed while the digital camera 100 is on standby for the imaging in the live view imaging, a list of setting items such as an electronic front curtain shutter, brightness of a monitor, WB of an LV screen, a 2-area enlargement, and silent imaging is displayed in one row in a state of being superimposed on the LV. The user can change a setting regarding a selected setting item and transition to an operation mode by selecting an arbitrary option in the displayed quick setting menu with use of the up/down key and pressing the SET button 75.

An active frame switching button 70d is a pressing button switch included in the operation unit 70, and the user can switch an active enlarged position (frame) between two enlarged portions by pressing the active frame switching button 70d in 2-area enlargement processing (2-area zooming processing), which will be described below. Further, a different function is assigned thereto depending on the operation mode, and the user can add a protected attribute to a displayed image by pressing this button in the playback mode.

The menu button 70e is a pressing button switch included in the operation unit 70, and the menu screen where the various kinds of settings can be made is displayed on the display unit 28.

Functional buttons 70f are three pressing button switches included in the operation unit 70, and a function is assigned to each of them. Each of the functional buttons 70f is disposed at a position that allows a finger (middle finger, ring finger, or little finger) of the right hand holding the grip portion 90 to operate the functional button 70f, and is pressed in the direction parallel with the direction (optical axis) of the subject light incident from the lens 103 on the imaging unit 22.

A power source control unit 80 includes a battery detection circuit, a direct-current-to-direct-current (DC-DC) converter, a switching circuit that switches a block to which power is supplied, and detects whether a battery is mounted, a type of the battery, and a remaining battery level. Further, the power source control unit 80 controls the DC-DC converter and supplies a required voltage to each of the units including the recording medium 200 for a required time period based on a result of this detection and an instruction from the system control unit 50.

A power source unit 30 includes a primary battery such as an alkaline battery and a lithium battery, a secondary battery such as a nickel-cadmium (NiCd) battery, a nickel metal hydride (NiMH) battery, and a lithium (Li) battery, an alternating-current (AC) adapter. A recording medium interface (I/F) 18 is an interface with the recording medium 200, such as a memory card and a hard disk. The recording medium 200 is a recording medium for recording the captured image, such as a memory card, and is constructed with use of a semiconductor memory, a magnetic disk, or the like.

A communication unit 54 is connected wirelessly or via a cable for a wired connection, and transmits and receives a video signal and an audio signal. The communication unit 54 can also be connected to a wireless local area network (LAN) or the Internet. The communication unit 54 can transmit the image captured by the imaging unit 22 (including the through-image) and the image recorded in the recording medium 200, and, further, can receive image data and other various kinds of information from an external apparatus.

An orientation detection unit 55 detects an orientation of the digital camera 100 with respect to a direction of gravitational force. It can be determined whether the image captured by the imaging unit 22 is an image captured with the digital camera 100 held in a landscape orientation or an image captured with the digital camera 100 held in a portrait orientation based on the orientation detected by the orientation detection unit 55. The system control unit 50 can add orientation information according to the orientation detected by the orientation detection unit 55 to an image file of the image captured by the imaging unit 22, and record the image after rotating the image. An acceleration sensor, a gyroscope sensor, or the like can be used as the orientation detection unit 55.

The digital camera 100 includes the touch panel 70a that can detect a touch on the display unit 28 as one element of the operation unit 70. The touch panel 70a and the display unit 28 can be configured integrally with each other. For example, the touch panel 70a is configured in such a manner that an optical transmittance thereof does not disturb the display on the display unit 28, and is mounted on an upper layer of a display surface of the display unit 28. Then, an input coordinate on the touch panel 70a and a display coordinate on the display unit 28 are associated with each other. This configuration can construct a graphical user interface (GUI) that appears as if the user can directly operate a screen displayed on the display unit 28. The system control unit 50 can detect the following operations on the touch panel 70a or states of the touch panel 70a.

A finger or a pen that has not touched the touch panel 70a newly touches the touch panel 70a. In other words, the touch is started (hereinafter referred to as a Touch-Down).

The touch panel 70a is being touched by the finger or the pen (hereinafter referred to as a Touch-On).

The finger or the pen is being moved while keeping touching the touch panel 70a (hereinafter referred to as a Touch-Move).

The finger or the pen that has been in touch with the touch panel 70a is separated from the touch panel 70a. In other words, the touch is ended (hereinafter referred to as a Touch-Up).

The touch-panel 70a is not touched by the finger or the pen (hereinafter referred to as a Touch-Off).

When the Touch-Down is detected, a start of the Touch-On is also detected at the same time. After the Touch-Down, the detection of the Touch-On normally continues unless the Touch-Up is detected. The Touch-Move is detected in a state where the Touch-On is also detected. Even when the Touch-On is detected, the Touch-Move is not detected unless a touched position is being moved. After detection of the Touch-Up of all of the fingers (finger) or the pens (pen) that have been in touch with the touch panel 70a, the touch panel 70a transitions to the Touch-Off.

The system control unit 50 is notified of these operations/states and a coordinate of the position touched by the finger or the pen on the touch panel 70a via an internal bus, and determines what kind of touch operation is performed on the touch panel 70a based on the information that the system control unit 50 is notified of. Regarding the Touch-Move, the system control unit 50 can also determine a movement direction of the finger or the pen being moved on the touch panel 70a based on a change in the coordinate of the position for each of a vertical component and a horizontal component on the touch panel 70a. Assume that the system control unit 50 determines that a slide operation is performed when detecting that the Touch-Move is performed by a predetermined distance or longer. An operation of quickly moving the finger only by a certain distance while keeping the finger in touch on the touch panel 70a, and separating the finger from the touch panel 70a directly therefrom will be referred to as a flick. In other words, the flick is an operation of quickly running the finger on the touch panel 70a as if flicking on the touch panel 70a with the finger. The system control unit 50 can determine that the flick is performed when detecting that the Touch-Move is performed by a predetermined distance or longer at a predetermined speed or higher and detecting the Touch-Up directly therefrom (can determine that the flick is performed subsequently to the slide operation). Further, a touch operation of touching a plurality of portions (e.g., two points) at the same time and moving the respective touched positions toward each other will be referred to as a pinch-in, and a touch operation of moving the respective touched positions away from each other will be referred to as a pinch-out. The pinch-in and the pinch-out will be collectively referred to as a pinch operation (or simply a pinch). The touch panel 70a may be embodied by employing any type of touch panel among touch panels based on various methods, such as a resistive film method, a capacitive method, a surface acoustic wave method, an infrared method, an electromagnetic induction method, an image recognition method, and an optical sensor method. Employable detection methods include a method that detects that the touch is input when the touch panel 70a is touched, and a method that detects that the touch is input when the finger or the pen just approaches the touch panel 70a, depending the type of the touch panel 70a, and the touch panel 70a may be embodied by employing any method of them.

Figures 3, 3A:
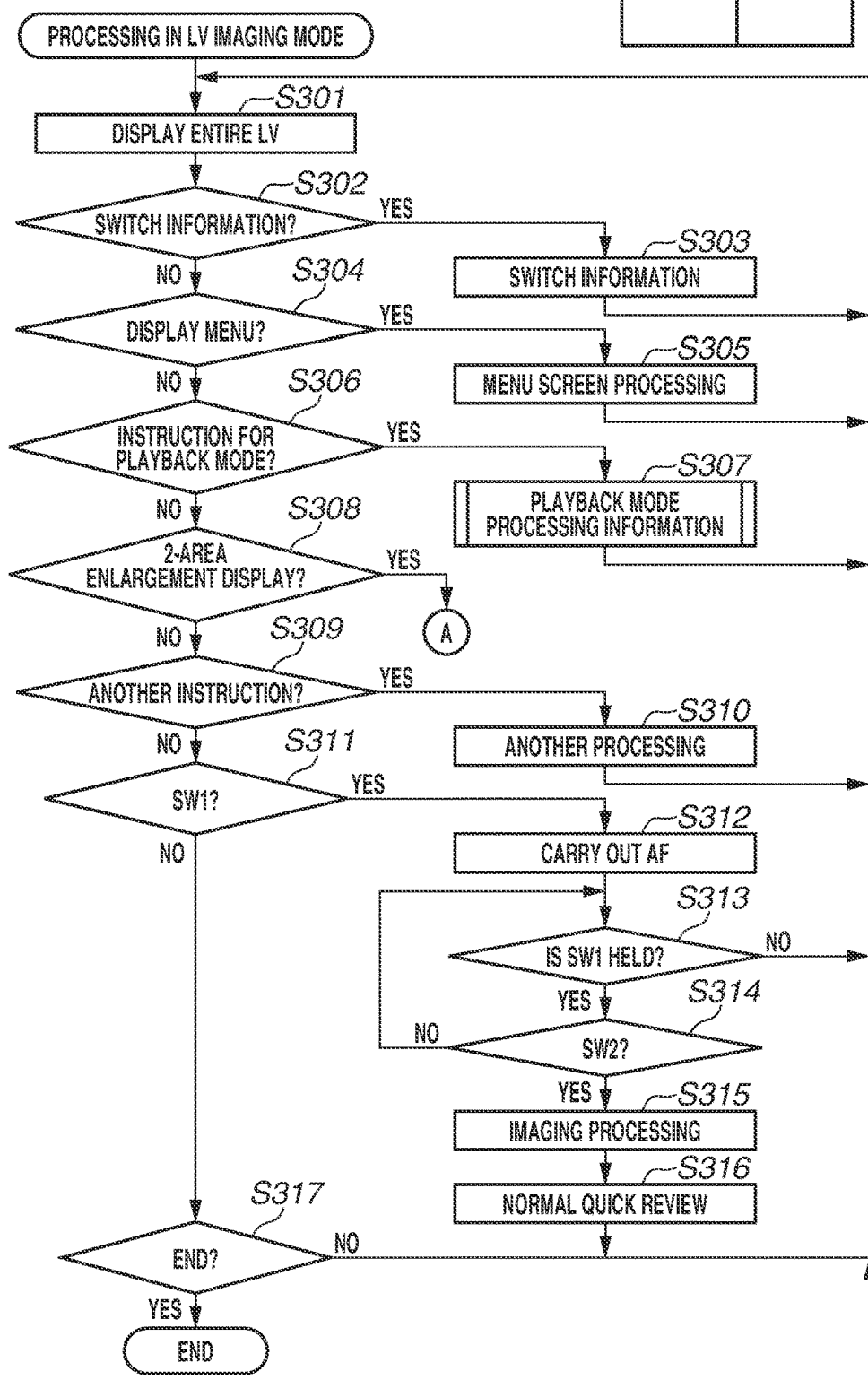
FIG. 3 (consisting of FIGS. 3A and 3B) is a flowchart illustrating processing in a live view (LV) imaging mode.
Figure 3B:
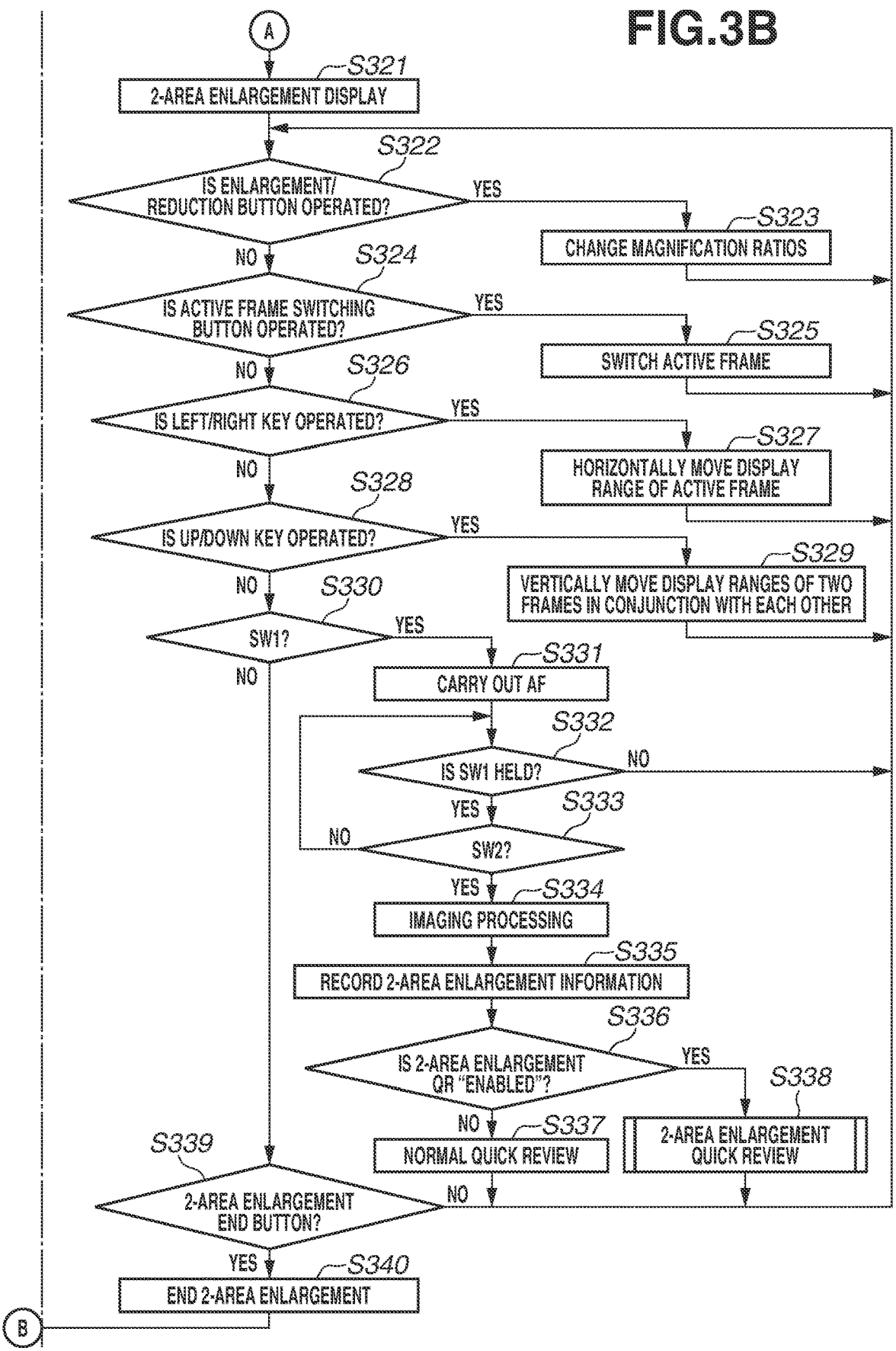

FIG. 3 (consisting of FIGS. 3A and 3B) is a flowchart illustrating a flow of processing when the digital camera 100 is on standby for the imaging. The program recorded in the nonvolatile memory 56 is loaded into the system memory 52 and executed by the system control unit 50, by which this processing is realized. When the digital camera 100 is started up in the imaging mode and the live view imaging is turned on, the processing illustrated in FIG. 3 is started.

In step S301, the system control unit 50 displays an imaging standby screen on the display unit 28. Types of the imaging screen include display modes 1 to 4 different from one another in terms of an amount of information displays displayed thereon, in particular, the number of items of imaging settings displayed thereon. In step S301, a display mode set last time is read out from the nonvolatile memory 56, and the imaging standby screen is displayed in the display mode set last time.

Figure 4A:
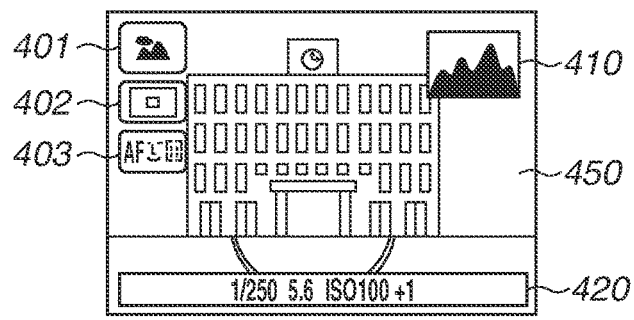
FIGS. 4A, 4B, 4C, and 4D illustrate display examples of an imaging standby screen.

FIG. 4A illustrates a display example of the imaging standby screen in the display mode 1. A live view image 450 (LV image 450) is displayed on the imaging standby screen in the display mode 1. The LV image 450 is an overall live view image containing an entire imaging range (a range contained in the captured image to be recorded as the image file). Further, an imaging mode icon 401, a drive mode icon 402, an AF method icon 403, a histogram 410, and exposure settings 402 are displayed in a state of being superimposed on the LV image 450. The imaging mode icon 401 indicates a currently set imaging mode among the plurality of imaging modes. The drive mode icon 402 indicates a currently set drive setting among capturing one image, capturing images continuously (continuous imaging), and self-timer imaging. The AF method icon 403 indicates a currently set AF method among AF methods such as face+tracking priority AF, live single-point AF, and live zone AF. The exposure settings 420 indicate a currently set shutter speed, aperture value, International Organization for Standardization (ISO) sensitivity, and exposure correction value. All of the imaging mode icon 401, the drive mode icon 402, the AF method icon 403, and the exposure settings 420 are imaging information indicating the current setting values of the settings regarding the imaging (imaging settings).

Figure 4C:
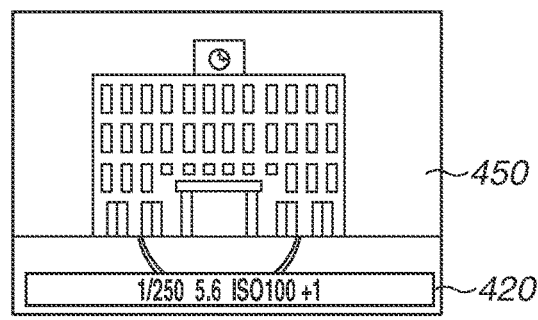
Figure 4B:
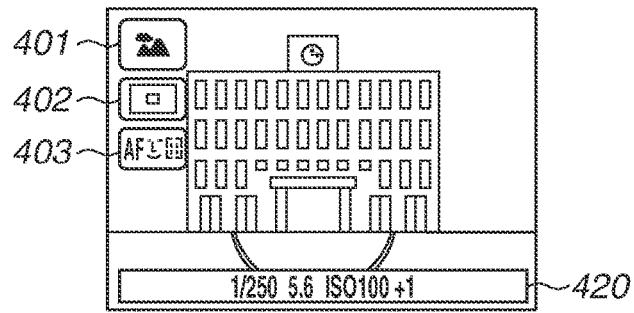
Figure 4D:
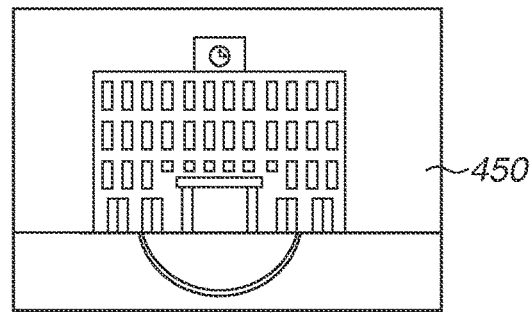

FIG. 4B illustrates a display example of the imaging standby screen in the display mode 2. The display mode 2 is a display mode with the histogram 410 hidden therefrom, compared to the display mode 1. FIG. 4C illustrates a display example of the imaging standby screen in the display mode 3. The display mode 3 is a display mode with the imaging mode icon 401, the drive mode icon 402, the AF method icon 403, and the histogram 410 hidden therefrom, compared to the display mode 1. Only the exposure settings 420 are displayed in a state of being superimposed on the LV image 450. FIG. 4D illustrates a display example of the imaging standby screen in the display mode 4. The display mode 4 is a display mode with the imaging mode icon 401, the drive mode icon 402, the AF method icon 403, the histogram 410, and the exposure settings 420 hidden therefrom, compared to the display mode 1. In other words, the display mode 4 is a mode in which all the information displays are hidden and only the LV image 450 is displayed. The display modes 1 to 4 can be switched according to pressing of an information switching button (INFO button) included in the operation unit 70.

In step S302, the system control unit 50 determines whether the information switching button (INFO button) included in the operation unit 70 is pressed. If the information switching button (INFO button) is pressed (YES in step S302), the processing proceeds to step S303. If not (NO in step S302), the processing proceeds to step S304. In step S303, the system control unit 50 switches the display mode to any of the above-described display modes 1 to 4 according to the pressing of the information switching button (INFO button). Further, the system control unit 50 records the switched current display mode setting into the nonvolatile memory 56 and the system memory 52.

In step S304, the system control unit 50 determines whether the menu button 70e is pressed. If the menu button 70e is pressed (YES in step S304), the processing proceeds to step S305. If not (NO in step S304), the processing proceeds to step S306. In step S305, the system control unit 50 displays the menu screen where the various kinds of settings can be made on the display unit 28, and makes the various kinds of settings according to an operation from the user. The menu screen also includes a setting item of whether a 2-area enlargement quick review (hereinafter referred to as a 2-area enlargement QR) is "enabled (turned on)" or "disabled (turned off)". If this setting item of enabling/disabling the 2-area enlargement quick review is selected by a user operation and an operation for changing the setting is performed, a changed setting value ("enabled" or "disabled") is stored into the nonvolatile memory 56 and the system memory 52. In other words, the user can set whether to "enable (turn on)" or "disable (turn off)" the 2-area enlargement QR in advance.

In step S306, the system control unit 50 determines whether an instruction operation for transitioning to the playback mode is performed. More specifically, the system control unit 50 determines whether the playback button 79 is pressed. If the playback button 79 is pressed (YES in step S306), the processing proceeds to step S307. If not (NO in step S306), the processing proceeds to step S308. In step S307, the system control unit 50 transitions to the playback mode and performs playback mode processing. Details of the playback mode processing will be described below with reference to FIG. 7.

In step S308, the system control unit 50 determines whether an instruction operation for transitioning to the 2-area enlargement display is performed. The instruction operation for transitioning to the 2-area enlargement display is an operation for displaying the quick setting menu, selecting the item indicating the 2-area enlargement included in the quick setting menu, and determining this selection. More specifically, when the Q button 70c is pressed on the imaging standby screen, a quick setting screen is displayed on the display unit 28 in a state of being superimposed on the live view image 450. On the quick setting menu, a group of icons each representing a different item is displayed while being juxtaposed, and a cursor is displayed on an icon set in a selected state. The cursor can be moved by an up/down operation on the cross key 74. When the SET button 75 is pressed with the cursor placed on the icon representing the item indicating the 2-area enlargement among the plurality of items displayed on the quick setting menu, the system control unit 50 determines that the instruction operation for transitioning to the 2-area enlargement display is performed. The instruction operation for transitioning to the 2-area enlargement display is not limited to the operation described here. If the instruction operation for transitioning to the 2-area enlargement display is performed (YES in step S308), the processing proceeds to step S321, and the system control unit 50 performs the 2-area enlargement processing. Details of the 2-area enlargement processing will be described in descriptions of step S321 and steps subsequent thereto. If the instruction operation for transitioning to the 2-area enlargement display is not performed (NO in step S308), the processing proceeds to step S309.

In step S309, the system control unit 50 determines whether another instruction operation is performed by the user. Examples of another instruction operation include an operation on the main electronic dial 71 for changing the shutter speed and/or the aperture, and an operation for changing the various kinds of imaging settings such as the ISO sensitivity, the exposure correction value, the imaging mode, the drive setting, and the AF method. If another instruction operation is performed (YES in step S309), the processing proceeds to step S310. If not (NO in step S309), the processing proceeds to step S311. In step S310, the system control unit 50 performs processing according to the other instruction operation, for example, changing the shutter speed and/or the aperture.

In step S311, the system control unit 50 determines whether the shutter button 61 is half pressed and SW1 is turned on. If SW1 is turned on (YES in step S311), the processing proceeds to step S312. If not (NO in step S311), the processing proceeds to step S317. In step S312, the system control unit 50 conducts the AF. Further, the system control unit 50 performs the imaging preparation processing such as the AE according to the setting in addition to the AF. If the digital camera 100 is focused as a result of the AF, a display at the time of an AF in-focus state is presented and/or a sound indicating the in-focus state is emitted. If the digital camera 100 is not focused, a display indicating this state is presented and/or a sound indicating this state is emitted. In step S313, the system control unit 50 determines whether the first shutter switch 62 is kept in the pressed state (SW1 is kept in the ON state). If SW1 is kept in the ON state (YES in step S313), the processing proceeds to step S314. If SW1 is not kept in the ON state, i.e., the shutter button 61 is released from the half-pressed state (NO in step S313), the system control unit 50 releases the AF in-focus state and the processing returns to step S301. In step S314, the system control unit 50 determines whether the shutter button 61 is fully pressed and SW2 is turned on. If SW2 is turned on (YES in step S314), the processing proceeds to step S315. If not (NO in step S314), the processing proceeds to step S313. In step S315, the system control unit 50 performs the above-described imaging processing (series of imaging processing operations from reading out the signal from the imaging unit 22 to writing the image film into the recording medium 200) according to the turning on of SW2.

In step S316, the system control unit 50 presents a normal quick review (normal QR) on the display unit 28. The normal quick review is a display of automatically displaying a newly captured image after the imaging processing on the display unit 28 for a predetermined time period (e.g., two seconds), thereby allowing the user to confirm the imaging. Types of the normal QR include normal QR modes 1 to 3 different from one another in terms of the number of information items displayed therein, and the normal QR mode when the normal QR has been presented last time is read out from the nonvolatile memory 56 and the normal QR is displayed in the same normal QR mode as the QR mode employed last time during the previous normal QR display. Assume that the system control unit 50 can switch the normal QR mode to a display mode arbitrarily selected by the user among the normal QR modes 1 to 3 according to a user operation during the normal QR. Further, the system control unit 50 stores the normal QR mode after the normal QR mode is switched into the nonvolatile memory 56. Further, the digital camera 100 may be configured in such a manner that an initial setting of the normal QR mode is set in advance on the menu screen or the like, and the system control unit 50 displays the normal QR in the normal QR mode set as the initial setting without employing the normal QR mode employed last during the previous normal QR display when presenting the normal QR for the first time after the digital camera 100 is powered on.

Figure 8A:
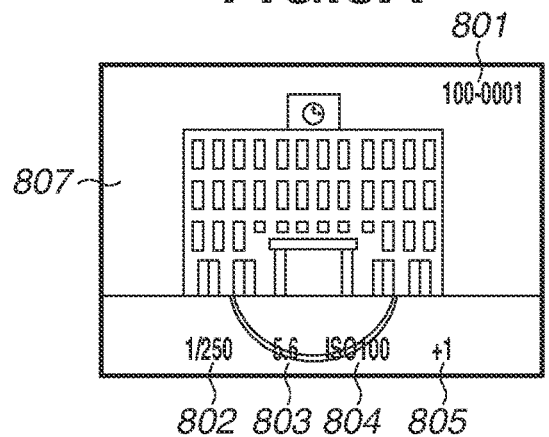
FIGS. 8A, 8B, 8C, 8D, 8E, and 8F illustrate display examples of a quick review display and a playback display.

FIG. 8A illustrates a display example in the normal QR mode 1. An already captured image 807 captured in the imaging processing in step S315 is displayed on the display unit 28. The already captured image 807 is a pre-compressed image captured in the imaging processing in step S315 and temporarily held in the memory 32 in the generation of the image file to be recorded into the recording medium 200, or an image displayed by playing back the image in the image file recorded in the recording medium 200. An image number 801, a shutter speed 802, an aperture value 803, an ISO sensitivity 804, and an exposure correction value 805 are displayed in a state of being superimposed on the already captured image 807. The shutter speed 802, the aperture value 803, the ISO sensitivity 804, and the exposure correction value 805 indicate the settings of the digital camera 100 when the already captured image 807 has been captured.

Figure 8B:
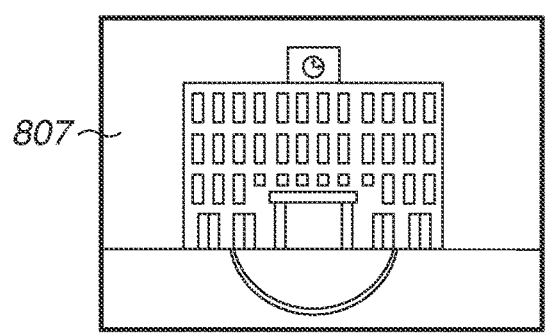

FIG. 8B illustrates a display example in the normal QR mode 2. Only the already captured image 807 is displayed on the display unit 28. The image number 801, the shutter speed 802, the aperture value 803, the ISO sensitivity 804, the exposure correction value 805, a histogram 806, an imaging mode 808, a drive mode 809, and an AF method 810 are hidden in the normal QR mode 2.

Figure 8C:
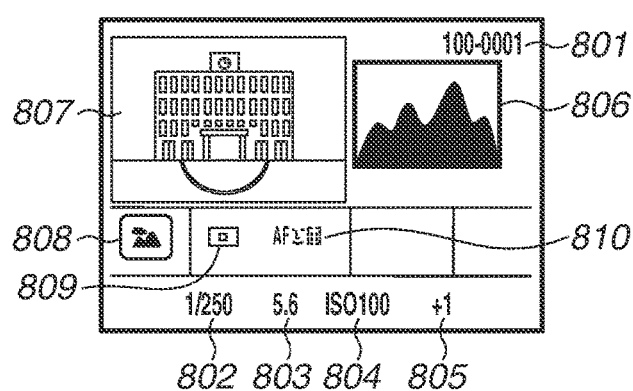

FIG. 8C illustrates a display example in the normal QR mode 3. The already captured image 807 is displayed at an upper left portion of the display unit 28 in a smaller size than in the normal QR modes 1 and 2. Along therewith, the image number 801, the shutter speed 802, the aperture value 803, the ISO sensitivity 804, the exposure correction value 805, the histogram 806, the imaging mode 808, the drive mode 809, and the AF method 810 are displayed. The imaging mode 808, the drive mode 809, and the AF method 810 indicate the settings of the digital camera 100 when the already captured image 807 has been captured.

When a predetermined time period (e.g., two seconds) has elapsed with no operation performed since the start of the display of the normal quick review or the user performs an operation for ending the quick review, the quick review is ended, and the digital camera 100 returns to the imaging standby state in step S301. The system control unit 50 may be configured not to perform the processing in step S316 in a case where the digital camera 100 is configured to allow the user to set whether to present the normal quick review on the menu screen in advance and is set not to present the normal quick review.

In step S317, the system control unit 50 determines whether an end event has occurred. If the end event has occurred (YES in step S317), the system control unit 50 ends the imaging mode processing. If not (NO in step S317), the processing returns to step S301 and is repeated. Assume that examples of the end event include power-off, and an end of the live view mode (switching to a mode of capturing the image via an optical finder).

Figure 5A:
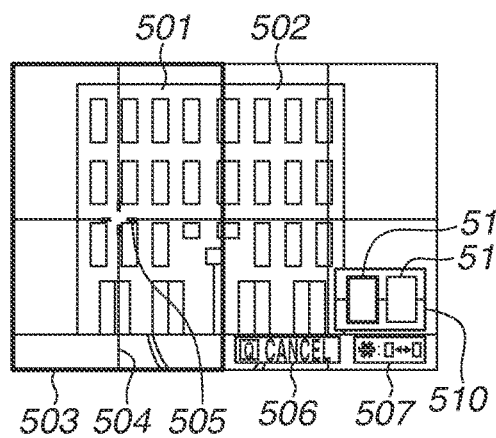
FIGS. 5A, 5B, 5C, 5D, 5E, and 5F illustrate display examples of a 2-area enlargement display.

In step S321, the system control unit 50 presents the 2-area enlargement display on the display unit 28. FIG. 5A illustrates a display example of the 2-area enlargement display. In the 2-area enlargement, live view images of two regions separated in a left/right direction (horizontal direction or width direction) or an up/down direction (vertical direction or height direction) are displayed in a state of being juxtaposed on one screen. FIG. 5A illustrates an example in which live view images of two regions separated in the left/right direction are displayed in a state of being juxtaposed on one screen. A left-side region 501 is a display region displaying a live view image captured at a partial region on a left side of the imaging unit 22. A right-side region 502 is a display region displaying a live view image captured at a partial region on a right side of the imaging unit 22. The live view images displayed in the left-side region 501 and the right-side region 502 are images captured at imaging regions of the imaging unit 22 that are located at the same height. An active frame 503 is a selection frame indicating one of the left-side region 501 and the right-side region 502 that is a region currently targeted for an operation (active region). In FIG. 5A, the active frame 503 is placed on the left-side region 501, and the left-side region 501 is targeted for a leftward or rightward movement, the AF, and the like. An assist line 504 is an assist line displayed along each of a center of the left-side region 501 in the left/right direction and a center of the left-side region 501 in the up/down direction, and an intersection point therebetween coincides with a center of the left-side region 501. An assist line along each of a center in the up/down direction and a center in the left/right direction is also displayed in the right-side region 502 in a similar manner. A central marker 505 is a marker displayed on the active frame side, and indicates the center of the left-side region 501 set as the active region. Both the assist line 504 and the central marker 505 are not displayed at the central portion of the active region, thereby allowing the user to confirm a subject located at the center. A guide 506 is a guidance display indicating an operation member (operation method) for ending the 2-area enlargement. A guide 507 is a guidance display indicating an operation member (operation method) for switching the active frame 503. An enlarged position guide 510 is a guide indicating portions displayed in an enlarged manner in the left-side region 501 and the right-side region 502 in the entire imaging range (entire live view image being captured by the imaging unit 22 or entire imaging range contained in the still image to be captured according to the imaging instruction). In other words, the enlarged position guide 510 is a guide indicating positions and sizes of two imaging regions corresponding to the left-side region 501 and the right-side region 502 with respect to the entire imaging range. A left-side indicator 511 indicates a range of the live view image that is displayed in the left-side region 501 with respect to the entire imaging range. A right-side indicator 512 indicates a range of the live view image that is displayed in the right-side region 502 with respect to the entire imaging range. As understood from the placement of the active frame 503 on the left-side region 501, the left-side indicator 511 is displayed in a different color or with a different line width from the right-side indicator 512. The guide 506, the guide 507, and the enlarged position guide 510 are displayed in a state of being superimposed on the live view image in the region without the active frame 503 placed thereon (inactive region) so as not to disturb visual confirmation of the live view image in the region with the active frame 503 placed thereon.

In step S322, the system control unit 50 determines whether the enlargement button 77 is pressed or the reduction button 78 is pressed (whether an enlargement/reduction instruction is issued). If the enlargement button 77 is pressed or the reduction button 78 is pressed (YES in step S322), the processing proceeds to step S323. If not (NO in step S322), the processing proceeds to step S324.

Figure 5D:
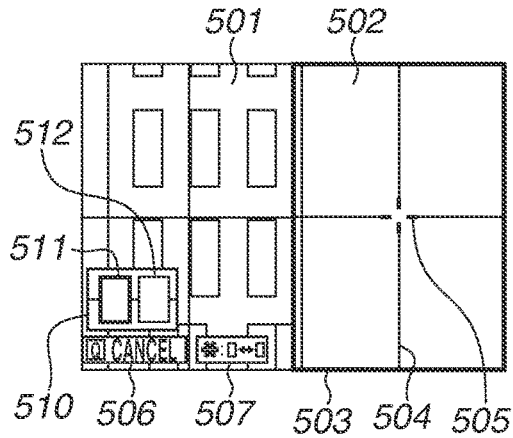
Figure 5B:
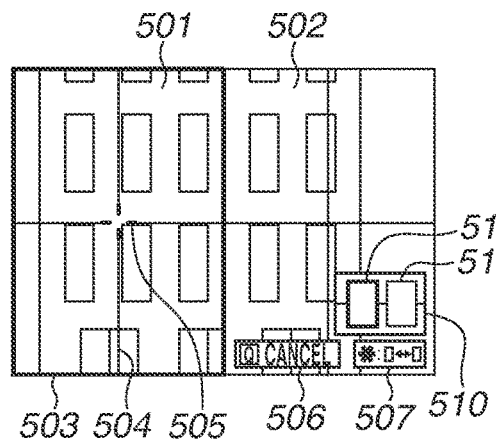

In step S323, the system control unit 50 changes magnification ratios of the LV images subjected to the 2-area enlargement according to the operation. If the enlargement button 77 is pressed, the system control unit 50 enlarges each of the LV images displayed in the left-side region 501 and the right-side region 502 so as to display it at a higher magnification ratio than a magnification ratio before the operation, and uses the same enlargement ratio for them (enlarges the LV images on the left side and the right side in conjunction with each other). If the reduction button 78 is pressed, the system control unit 50 reduces each of the LV images displayed in the left-side region 501 and the right-side region 502 so as to display it at a lower magnification ratio than the magnification ratio before the operation, and uses the same enlargement ratio for them. The changed enlargement ratios are recorded in the system memory 52, and, even when the 2-area enlargement is temporarily ended, the display is started from the same enlargement ratios if the 2-area enlargement display is presented again without the digital camera 100 powered off. FIG. 5B illustrates a display example when the enlargement button 77 is pressed and the live view images are enlarged from the state illustrated in FIG. 5A. The live view images displayed in the left-side region 501 and the right-side region 502 are each more enlarged in FIG. 5B than in FIG. 5A. Further, the enlargement leads to a display of a narrower range in the entire imaging range, thereby leading to a smaller size of each of the left-side indicator 511 and the right-side indicator 512 displayed in the enlarged position guide 510 in FIG. 5B than in FIG. 5A.

In step S324, the system control unit 50 determines whether the active frame switching button 70d is pressed. If the active frame switching button 70d is pressed (YES in step S324), the processing proceeds to step S325. If not (NO in step S324), the processing proceeds to step S326.

Figure 5E:
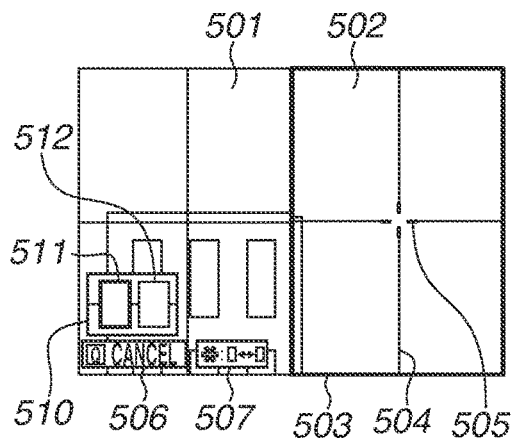
Figure 5C:
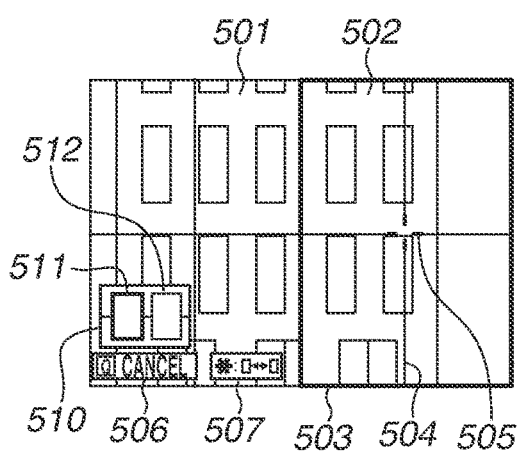

In step S325, the system control unit 50 moves the active frame 503 from the region with the active frame 503 placed thereon before the operation to the other region. FIG. 5C illustrates a display example when the active frame switching button 70d is pressed and the active frame 503 is moved from the state illustrated in FIG. 5B. The active frame 503 placed on the left-side region 501 in FIG. 5B is switched to the right-side region 502 in FIG. 5C. Further, the guide 506, the guide 507, and the enlarged position guide 510 are moved to positions superimposed on the left-side region 501 now set as the inactive frame.

In step S326, the system control unit 50 determines whether the left/right key in the cross key 74 is operated. If the left/right key is operated (YES in step S326), the processing proceeds to step S327. If not (NO in step S326), the processing proceeds to step S328.

In step S327, the system control unit 50 moves the display range in the region with the active frame 503 placed thereon leftward or rightward according to the operation on the left/right key. More specifically, the system control unit 50 moves the display range in the region with the active frame 503 placed thereon leftward if the left button is pressed, and moves the display range in the region with the active frame 503 placed thereon rightward if the right button is pressed. FIG. 5D illustrates a display example when the right button is pressed several times from the state illustrated in FIG. 5C. The enlarged region displayed in the right-side region 502 with the active frame 503 placed thereon is moved more rightward in the imaging range in FIG. 5D than in FIG. 5C. Thus, the video image itself is scrolled from the right to the left. At this time, the display range in the left-side region 501 set as the inactive frame is not changed (i.e., the image is moved leftward or rightward in a disconnected manner when the left and right regions are out of contact with each other). In the enlarged position guide 510, the right-side indicator 512 is moved more rightward in FIG. 5D than in FIG. 5C so as to indicate that the display range in the right-side region 502 is moved further rightward. The changed display range (display position) is recorded into the system memory 52, and, even when the 2-area enlargement is temporarily ended, the same display range is displayed as the 2-area enlargement display if the 2-area enlargement display is presented again without the digital camera 100 powered off. If a right edge of the display range in the left-side region 501 is in contact with a left edge of the display range in the right-side region 502, both the display ranges in the left-side region 501 and the right-side region 502 are moved rightward in conjunction with each other according to the instruction for the further rightward movement even when the active frame 503 is placed on the left-side region 501. However, when the right-side region 502 reaches a right edge of the entire imaging range, the display ranges cannot be moved further rightward and therefore are not moved even when the instruction for the further rightward movement is issued. On the other hand, if the left edge of the display range in the right-side region 502 is in contact with the right edge of the display range in the left-side region 501, both the display ranges in the left-side region 501 and the right-side region 502 are moved leftward in conjunction with each other according to an instruction for a further leftward movement even when the active frame 503 is placed on the right-side region 502. However, when the left-side region 501 reaches a left edge of the entire imaging range, the display ranges cannot be moved further leftward and therefore are not moved even when the instruction for the further leftward movement is issued.

In step S328, the system control unit 50 determines whether the up/down key in the cross key 74 is operated. If the up/down key is operated (YES in step S328), the processing proceeds to step S329. If not (NO in step S328), the processing proceeds to step S330.

In step S329, the system control unit 50 moves the display ranges in the left-side region 501 and the right-side region 502 upward or downward in conjunction with each other according to the operation on the up/down key. More specifically, the system control unit 50 moves the display ranges in the left-side region 501 and the right-side region 502 upward in conjunction with each other if the up button is pressed, and moves the display ranges in the left-side region 501 and the right-side region 502 downward in conjunction with each other if the down button is pressed. FIG. 5E illustrates a display example when the up button is pressed several times from the state illustrated in FIG. 5D. The display range in each of the left-side region 501 and the right-side region 502 is moved more upward in the imaging range in FIG. 5E than in FIG. 5D. Thus, the video image itself is scrolled from the top to the bottom. In the enlarged position guide 510, the left-side indicator 511 and the right-side indicator 512 are moved more upward in FIG. 5E than in FIG. 5D so as to indicate that the display ranges in the left-side region 501 and the right-side region 502 are moved further upward. The changed display ranges (display positions) are recorded in the system memory 52, and, even when the 2-area enlargement is temporarily ended, the same display ranges are displayed as the 2-area enlargement display if the 2-area enlargement display is presented again without the digital camera 100 powered off.

Figure 5F:
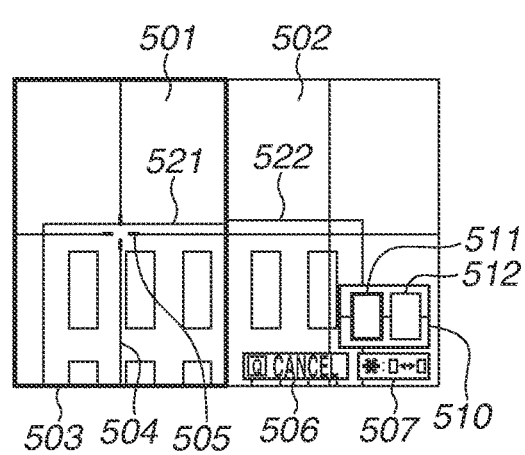

The user can capture an image in which a line of the subject appears to extend horizontally by repeating the operation like the above-described example to set the display ranges in the 2-area enlargement to separated two positions on a horizon, a horizontal line, a transverse outline of a building, or the like, adjust the orientation of the camera 100 in such a manner that lines of the subject in the left and right regions are in alignment with each other, and then capture the image. FIG. 5F illustrates a display example when, in the 2-area enlargement display, the left-side region 501 is set to a subject portion including a horizontal line 521 on a left side of the building (subject), and the right-side region 502 is set to a subject portion including a horizontal line 522 on a right side of the building at a position separated from the horizontal line 521. The horizontal line of the building is supposed to be a straight line under normal circumstances, but, in the example illustrated in FIG. 5F, the horizontal line 521 displayed in the left-side region 501 and the horizontal line 522 displayed in the right-side region 502 do not appear to be a connected straight line and are slightly out of alignment with each other. The user can be aware that the digital camera 100 is not held horizontally with respect to the building by viewing such a display. The user can acquire the image in which the horizontal line of the building appears to extend horizontally by capturing the image after adjusting the orientation of the digital camera 100 to such an orientation that the user can visually confirm the horizontal line 521 and the horizontal line 522 as one straight line. The user can also adjust the orientation horizontally with respect to the gravitational force by performing the above-described operation in conformity with a horizontal line of a waterfront, such as the sea and a lake.

In step S330, the system control unit 50 determines whether the shutter button 61 is half pressed and SW1 is turned on. If SW1 is turned on (YES in step S330), the processing proceeds to step S331. If not (NO in step S330), the processing proceeds to step S339.

In step S331, the system control unit 50 conducts the AF with respect to the central portion (position indicated by the central marker 505) in the active frame 503 without ending the 2-area enlargement. If the digital camera 100 is focused as a result of the AF operation, the focus is fixed (AF is locked) while SW1 is kept turned on.

In step S332, the system control unit 50 determines whether SW1 is kept turned on. If SW1 is kept turned on (YES in step S332), the processing proceeds to step S333. If not (NO in step S332), the AF lock state is released and the processing proceeds to step S322.

In step S333, the system control unit 50 determines whether the shutter button 61 is fully pressed and SW2 is turned on. If SW2 is turned on (YES in step S333), the processing proceeds to step S334. If not (NO in step S333), the processing proceeds to step S332.

In step S334, the system control unit 50 performs the above-described imaging processing (series of imaging processing operations from reading out the signal from the imaging unit 22 to writing the image file into the recording medium 200). The image captured by the imaging processing is not an image of the range subjected to the 2-area enlargement display but is an image of the imaging range.

In step S335, the system control unit 50 records 2-area enlargement information into the image file acquired by the imaging processing in step S334 as attribute information. The 2-area enlargement information includes information indicating that the image is captured with the 2-area enlargement display being presented, and information indicating the enlargement ratios and the display ranges of the left-side region 501 and the right-side region 502 (i.e., the imaging region corresponding to each of the regions 501 and 502) immediately before the imaging. The information indicating the enlargement ratios and the display ranges of the left-side region 501 and the right-side region 502 immediately before the imaging refers to the enlargement ratios stored in the system memory 52 in step S323 and the positions of the display ranges stored in the system memory 52 in step S327 or S329. This information may include information indicating which region the active frame 503 is placed on.

In step S336, the system control unit 50 refers to the setting information recorded in the nonvolatile memory 56, and determines whether the setting of the enablement/disablement of the 2-area enlargement quick review is set to "enabled (turned on)". If the 2-area enlargement quick review is set to "enabled (turned on)" (YES in step S336), the processing proceeds to step S338. If not (if the 2-area enlargement quick review is set to "disabled (turned off)" (NO in step S336), the processing proceeds to step S337. In step S337, the system control unit 50 presents the normal quick review. This processing is similar processing to step S316, and therefore the description thereof will be omitted here.

In step S338, the system control unit 50 presents the 2-area enlargement quick review. The 2-area enlargement quick review is a display of automatically displaying the newly captured image after the imaging processing on the display unit 28 as the 2-area enlargement display for a predetermined time period (e.g., two seconds), thereby allowing the user to confirm whether the user has been able to image the subject horizontally. Details of this processing will be described below with reference to FIG. 6. The present processing has been described referring to the example in which the processing returns to step S322 after an end of the normal quick review in step S337 or the 2-area enlargement quick review in step S338 and the system control unit 50 continues the 2-area enlargement display, but the system control unit 50 may end the 2-area enlargement and return to the live view display of the entire imaging range (display the image at the same magnification ratio, display the image at the normal magnification ratio) without the processing returning to step S322. In other words, the processing may proceed to step S301 after step S337 or S338.

In step S339, the system control unit 50 determines whether a button for ending the 2-area enlargement is pressed. The button for ending the 2-area enlargement is the Q button 70c in the present exemplary embodiment. If the Q button 70c is pressed (YES in step S339), the processing proceeds to step S340. If not (NO in step S339), the processing returns to step S322 and is repeated.

In step S340, the system control unit 50 ends the 2-area enlargement display. Then, the processing proceeds to step S301, and the system control unit 50 returns the display to the overall display of the live view image.

Figure 6:
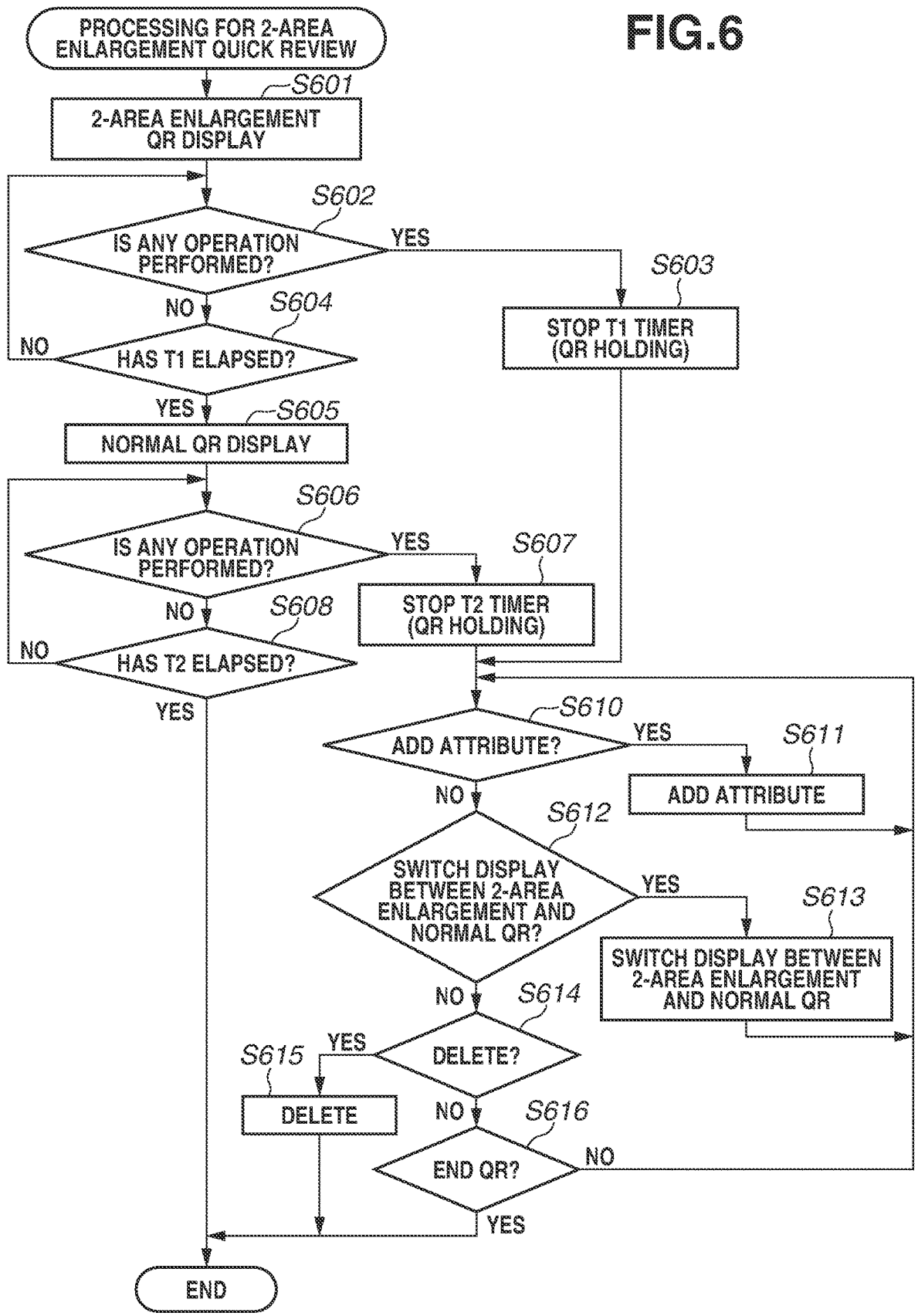
FIG. 6 is a flowchart illustrating processing for a 2-area enlargement quick review.

FIG. 6 illustrates a detailed flowchart of the processing for the 2-area enlargement quick review described above in step S338 illustrated in FIG. 3. The program recorded in the nonvolatile memory 56 is loaded into the system memory 52 and executed by the system control unit 50, by which this processing is realized.

Figure 8D:
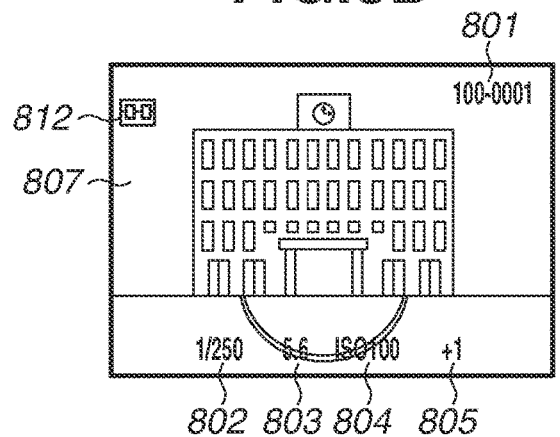
Figure 8E:
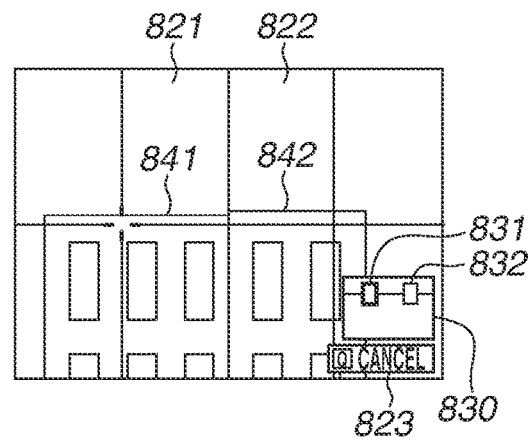

In step S601, the system control unit 50 presents the 2-area enlargement QR display on the display unit 28. FIG. 8E illustrates a display example of the 2-area enlargement QR display. Most thereof is displayed in a similar display manner to the 2-area enlargement display before the imaging like FIGS. 5A to 5F, and is displayed in a similar display manner to the state of the 2-area enlargement display immediately before the imaging processing in step S334. However, the operation for, for example, adjusting the enlarged position to be displayed in the 2-area enlargement display may be completed before the imaging, and is less likely to be performed during the quick review for quickly confirming the result of the imaging. Therefore, the active frame, the central marker, the guide for switching the active frame, and the display indicating which one of the left-side indicator and the right-side indicator is active are not displayed, unlike FIGS. 5A to 5F. Further, the displayed image is not the live view image but is the already captured image. In FIG. 8E, both a left-side region 821 and a right-side region 822 are each a region displaying a partial range of the already captured image captured by the imaging processing in step S334. The already captured image is the pre-compressed image temporarily held in the memory 32 when the image file to be recorded into the recording medium 200 is generated, or the image displayed by playing back the image in the image file recorded in the recording medium 200. The left-side region 821 is a partial range on the left side in the already captured image, and is a region displaying a range in the already captured image that has been captured at the partial region on the left side of the imaging unit 22. The right-side region 822 is a partial range on the right side in the already captured image, and is a region displaying a range in the already captured image that has been captured at the partial region on the right side of the imaging unit 22. Positions and enlargement ratios of the display ranges displayed in the left-side region 821 and the right-side region 822 are the latest values adjusted during the 2-area enlargement display in the above-described steps, steps S321 to S329, and are equivalent to the magnification ratios recorded in step S323 at last and the positions of the display ranges recorded in step S327 or S329 at last. The display ranges displayed in the left-side region 821 and the right-side region 822 are regions at the same height in the already captured image. A guide 823 is a guidance display indicating an operation member (operation method) for ending the 2-area enlargement in the quick review. An enlarged position guide 830 is a guide indicating the portions in the entire already captured image that are displayed in the left-side region 821 and the right-side region 822 in the enlarged manner. A left-side indicator 831 indicates the range in the entire already captured image that is displayed in the left-side region 821. A right-side indicator 832 indicates the range in the entire already captured image that is displayed in the right-side region 822. Even if the 2-area enlargement display is presented and the orientation of the camera 100 is adjusted so as to establish the horizontally before the imaging, and then the image is captured, the orientation may be tilted at the time of the imaging processing due to a force pressing the shutter button 61 and/or another reason. Presenting the 2-area enlargement quick review like the example illustrated in FIG. 8E allows the user to confirm whether the image has been able to be captured horizontally without being unintentionally tilted in this manner immediately after the imaging. In the example illustrated in FIG. 8E, it can be visually found out that a horizontal line 841 and a horizontal line 842 on the left side and the right side of the building (i.e., subject) are slightly out of alignment with each other, and therefore it can be understood that the image has failed to be captured horizontally in a strict sense, which allows the user to be aware that the image should be captured again. In step S601, the system control unit 50 presents the 2-area enlargement QR display, and also starts measurement of T1, which is a time period until the 2-area enlargement QR display is supposed to be automatically ended.

In step S602, the system control unit 50 determines whether a valid operation (operation regarding the image displayed as the quick review display) is performed on any operation member included in the operation unit 70. If some operation is performed (YES in step S602), the processing proceeds to step S603. If no operation is performed (NO in step S602), the processing proceeds to step S604.

In step S603, the system control unit 50 stops the measurement by the timer measuring T1 that has been measured since the start of the 2-area enlargement QR display. This stop prevents the 2-area enlargement QR display from being automatically ended, and establishes a quick review holding state in which the 2-area enlargement QR display is maintained (held) even after T1 has elapsed unless an operation for ending the quick review display is performed. Subsequently, the processing proceeds to step S610 and steps after that, and the system control unit 50 performs processing according to the operation detected in step S602 and processing according to an operation performed after that. The digital camera 100 may be configured to display the active frame, the central marker, the guide for switching the active frame, and the display indicating which one of the left-side indicator and the right-side indicator is active according to the establishment of the quick review holding state during the 2-area enlargement QR display. Then, the digital camera 100 may be configured to transition to a state capable of receiving operations for switching the active frame, moving the enlarged position (display range), and changing the magnification ratio. Methods for the operations are similar to those described in the descriptions of the above-described steps, S321 to S329 illustrated in FIG. 3.

In step S604, the system control unit 50 determines whether T1, which is the time period until the 2-area enlargement QR display is supposed to be automatically ended, has elapsed. T1 is, for example, two seconds. The value of T1 may be a value that the user can set to an arbitrary time period from the menu screen or the like in advance, or may be a predetermined time period. Further, values settable by the user may include "2-area enlargement QR holding", and the processing is assumed to proceed to step S610 without measuring T1 even after the 2-area enlargement QR display is started in this case. If the system control unit 50 determines that T1 has elapsed in step S604 (YES in step S604), the processing proceeds to step S605. If not (NO in step S604), the processing returns to step S602.

In step S605, the system control unit 50 ends the 2-area enlargement QR display, and switches the display manner of the quick review to the normal QR display. This processing is similar to step S337 illustrated in FIG. 3, and the quick review is displayed in the display manner illustrated in any of FIGS. 8A to 8C. However, in this case, the digital camera 100 can transition from the normal QR display to the 2-area enlargement QR display again by the user's operation. To indicate that, a guide 812, which indicates that the digital camera 100 can transition to the 2-area enlargement display during the quick review display, is displayed as illustrated in FIG. 8D. FIG. 8D illustrates an example in which the guide 812 is displayed in a case of the normal QR mode 1, but the guide 812 is also displayed in a case of the normal QR modes 2 and 3 in a similar manner. The digital camera 100 may be configured to hide the guide 812 when a predetermined time period (e.g., three seconds) has elapsed since the establishment of the quick review holding state. Further, in step S605, the system control unit 50 starts measurement of T2, which is a time period until the normal QR display is supposed to be automatically ended, along with starting the normal QR display.

In step S606, the system control unit 50 determines whether a valid operation (operation regarding the displayed image) is performed on any operation member included in the operation unit 70. If some operation is performed (YES in step S606), the processing proceeds to step S607. If no operation is performed (NO in step S606), the processing proceeds to step S608.

In step S607, the system control unit 50 stops the measurement by the timer measuring T2 that has been measured since the start of the normal QR display. This stop establishes the quick review holding state in which the normal QR display is not automatically ended. Subsequently, the processing proceeds to step S610 and steps after that, and the system control unit 50 performs processing according to the operation detected in step S606 and processing according to an operation performed after that.

In step S608, the system control unit 50 determines whether T2, which is the time period until the normal QR display is supposed to be automatically ended, has elapsed. T2 is, for example, two seconds. The value of T2 may be a value that the user can set to an arbitrary time period from the menu screen or the like in advance, or may be a predetermined time period. Further, the values settable by the user may include "normal QR holding", and the processing is assumed to proceed to step S610 without measuring T2 even after the normal QR display is started in this case. If the system control unit 50 determines that T2 has elapsed in step S608 (YES in step S608), the processing exits the flow illustrated in FIG. 6 and proceeds to step S321 illustrated in FIG. 3. If not (NO in step S608), the processing returns to step S606.

In step S610, the system control unit 50 determines whether an operation for adding an attribute to the image file of the displayed already-captured image is performed. Examples of addable attributes include the protected attribute and a favorite degree (rating information). For example, the user can add the protected attribute by pressing a protection button included in the operation unit 70. If the system control unit 50 determines that the operation for adding an attribute is performed (YES in step S610), the processing proceeds to step S611. If not (NO in step S610), the processing proceeds to step S612. In step S611, the system control unit 50 records attribute information corresponding to the operation into the image file of the displayed already-recorded image as metadata.

In step S612, the system control unit 50 determines whether an operation for switching the 2-area enlargement QR display and the normal QR display is performed. The 2-area enlargement QR display and the normal QR display are assumed to be able to be switched by, for example, an operation of pressing the active frame switching button 70*d*, pressing the Q button 70*c*, or touching the guide 812 or the guide 823, but the operation for switching the 2-area enlargement QR display and the normal QR display is not limited thereto. If the operation for switching the 2-area enlargement QR display and the normal QR display is performed (YES in step S612), the processing proceeds to step S613. If not (NO in step S612), the processing proceeds to step S614. In step S613, the system control unit 50 switches the 2-area enlargement QR display and the normal QR display. More specifically, the system control unit 50 switches the display to the normal QR display if the display is held at the 2-area enlargement QR display, and switches the display to the 2-area enlargement QR display if the display is held at the normal QR display.

In step S614, the system control unit 50 determines whether an operation for deleting (eliminating) the displayed already-captured image is performed. If the operation for deleting the displayed already-captured image is performed (YES in step S614), the processing proceeds to step S615. If not (NO in step S614), the processing proceeds to step S616. The operation for deleting the displayed already-captured image is, for example, pressing a deletion button included in the operation unit 70. In step S615, the system control unit 50 deletes the image file of the displayed already-captured image from the recording medium 200.

In step S616, the system control unit 50 determines whether an operation for ending the QR display is performed. If the operation for ending the QR display is performed (YES in step S616), the system control unit 50 ends the QR display and the processing proceeds to step S321 illustrated in FIG. 3. If not (NO in step S616), the processing returns to step S610 and is repeated. The operation for ending the QR display is, for example, pressing the menu button 70*e* or half pressing the shutter button 61.

As described above, according to the 2-area enlargement QR display, when confirming the image in the imaging standby state before the imaging and after the imaging, the user can confirm the image in the 2-area enlargement manner similar to each other, thereby quickly confirming whether the vibration generated at the time of the imaging due to, for example, the pressing of the shutter button 61 has influenced the captured image. If being able to confirm the influence, the user can capture the image again immediately, which further increases convenience for the user. Further, as described above, the digital camera 100 transitions from the 2-area enlargement QR display to the normal QR display due to the elapse of the predetermined time period T1. Therefore, the user can confirm horizontal misalignment of the subject by the 2-area enlargement QR display, and also confirm how the entire captured image looks like by the normal QR display. The user does not have to touch the digital camera 100 during that confirmation period, which prevents the horizontal orientation of the digital camera 100 adjusted in a state of being set on a tripod or the like from being accidentally changed. Further, when the user operation is input, the digital camera 100 does not return from the 2-area enlargement display to the normal image playback display after the predetermined time period has elapsed, which allows the user to take time for the confirmation if wanting to continue the 2-area enlargement display.

The present exemplary embodiment has been described referring to the example in which the digital camera 100 does not display the active frame, the central marker in the active region, the guide for switching the active frame, and the display indicating which one of the left-side indicator and the right-side indicator is active in step S601 illustrated in FIG. 6. However, the present exemplary embodiment is not limited thereto, and the digital camera 100 may display the active frame, the central marker, the guide for switching the active frame, and the display indicating which one of the left-side indicator and the right-side indicator is active, similarly to FIGS. 5A to 5F.

Figure 7:
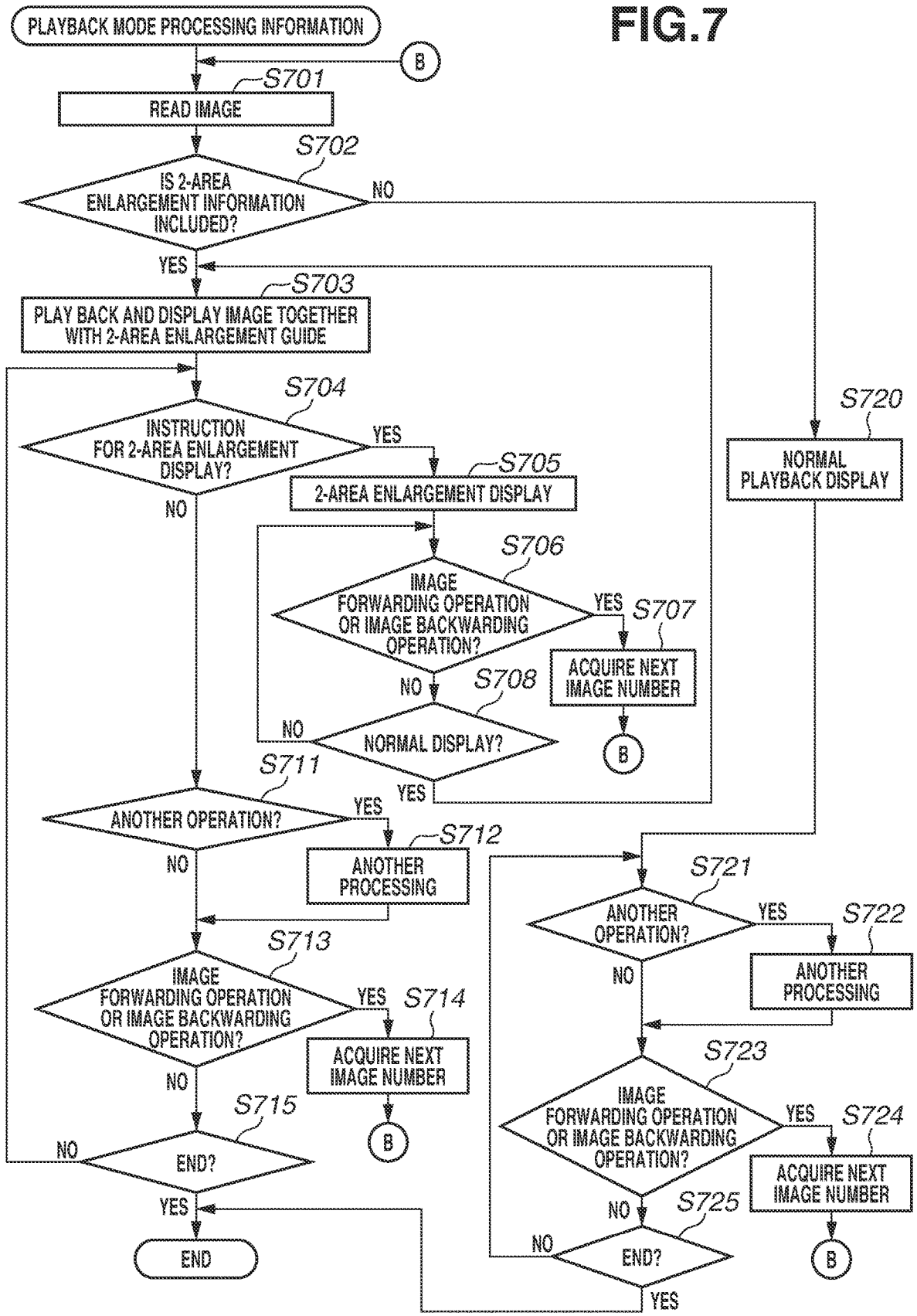
FIG. 7 is a flowchart illustrating playback mode processing.

FIG. 7 illustrates a detailed flowchart of the playback mode processing (playback control) in the step S307 illustrated in FIG. 3 described above. The program recorded in the nonvolatile memory 56 is loaded into the system memory 52 and executed by the system control unit 50, by which this processing is realized.

In step S701, the system control unit 50 reads the image to be displayed from the recording medium 200. Assume that the image that should be displayed for the first time since the transition to the playback mode is the latest image (image captured last) recorded in the recording medium 200 or the image played back and displayed last during a previous playback.

In step S702, the system control unit 50 determines whether the 2-area enlargement information is recorded as the attribute information of the image read in step S701. The 2-area enlargement information refers to the information added to the image in step S335. If the 2-area enlargement information is included (YES in step S702), the processing proceeds to step S703. If not (NO in step S702), the processing proceeds to step S720.

In step S703, the system control unit 50 plays back and displays the image together with the 2-area enlargement guide on the display unit 28. The image is played back and displayed together with the 2-area enlargement guide in a similar display manner to FIG. 8D described above. The already captured image 807 read from the recording medium 200 is entirely displayed on the display unit 28. Further, the guide 812, which indicates this image is the image with the 2-area enlargement information added thereto, is displayed together with the already captured image 807. By viewing the display of the guide 812, the user can be aware that this image is the image captured while being displayed as the 2-area enlargement display at the time of the imaging and can be displayed as the 2-area enlargement display according to an enlarged position and a magnification ratio similar to those at the time of the imaging by issuing the instruction for the 2-area enlargement display.

In step S704, the system control unit 50 determines whether an instruction operation for presenting the 2-area enlargement display is performed. If the instruction operation for presenting the 2-area enlargement display is performed (YES in step S704), the processing proceeds to step S705. If not (NO in step S704), the processing proceeds to step S711. Examples of the instruction operation for presenting the 2-area enlargement display include pressing the active frame switching button 70*d* and touching the guide 812.

Figure 8F:
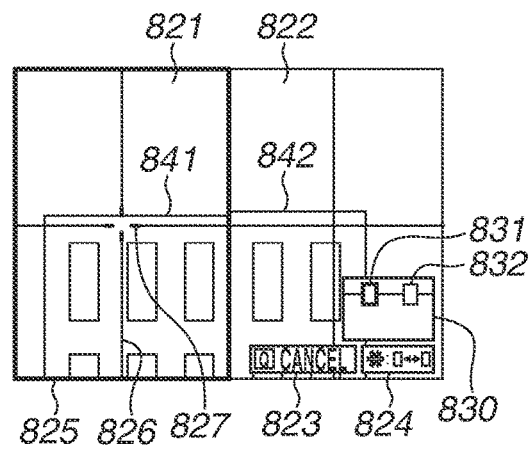

In step S705, the system control unit 50 presents the 2-area enlargement display. FIG. 8F illustrates a display example of the 2-area enlargement display in the playback mode. A partial region on a left side of the played-back already-captured image is displayed in an enlarged manner in the left-side region 821, and a partial region on a right side of the same already captured image is displayed in an enlarged manner in the right-side region 822. Positions and enlargement ratios of display ranges initially displayed in the left-side region 821 and the right-side region 822 are determined based on the 2-area enlargement information recorded as the attribute information. In other words, these positions and enlargement ratios are the latest values adjusted during the 2-area enlargement display in the above-described steps S321 to S329 at the time of the imaging, and are the same as the magnification ratios recorded in step S323 last and the positions of the display ranges recorded in step S327 or S329 last. In the 2-area enlargement display in the playback mode, an active frame 825, a central marker 827, a guide 824 for switching the active frame 825, and a display indicating which one of the left-side indicator and the right-side indicator is active are also displayed similarly to FIGS. 5A to 5F. Then, assume that the system control unit 50 receives the operation for switching the active frame 825, the operation for changing the position of the display range, and the operation for changing the enlargement ratio similarly to the above-described steps S321 to S329.

In step S706, the system control unit 50 determines whether an image forwarding operation or image backwarding operation is performed. If the image forwarding operation or the image backwarding operation is performed (YES in step S706), the processing proceeds to step S707. If not (NO in step S706), the processing proceeds to step S708. In step S707, the system control unit 50 acquires an image number of an image that should be displayed next according to the image forwarding operation or the image backwarding operation. For example, if the performed operation is an image forwarding operation of one frame (skipping to an image immediately subsequent to the currently displayed image), the system control unit 50 acquires an image number next to the currently displayed image. Then, the processing proceeds to step S701, and the system control unit 50 reads in the image that should be displayed next from the recording medium 200 and repeats the processing.

In step S708, the system control unit 50 determines whether an operation for returning the display to the normal playback display is performed. If the operation for returning the display to the normal playback display is performed (YES in step S708), the processing proceeds to step S703. If not (NO in step S708), the processing returns to step S706. Assume that the operation for returning the display to the normal playback display is pressing the Q button 70c or touching the guide 823.

In step S711, the system control unit 50 determines whether another operation is performed. If the system control unit 50 determines that another operation is performed (YES in step S711), the processing proceeds to step S712. In step S712, the system control unit 50 performs processing according to the other operation. If not (NO in step S711), the processing proceeds to step S713. Examples of the processing according to the other operation include an enlargement/reduction of the image, a transition to a multi-screen, deletion of the image, an addition of the rating information, and a transfer, but detailed descriptions thereof will be omitted here.

In step S713, the system control unit 50 determines whether the image forwarding operation or image backwarding operation is performed. If the image forwarding operation or image backwarding operation is performed (YES in step S713), the processing proceeds to step S714. If not (NO in step S713), the processing proceeds to step S715. Processing in step S714 is similar to that in step S707, and therefore a description thereof will be omitted here.

In step S715, the system control unit 50 determines whether an event triggering an end of the playback mode processing has occurred. Examples of the event triggering the end include an event of transitioning to the imaging mode and an event of powering off the digital camera 100. If the event triggering the end has occurred (YES in step S715), the playback mode processing is ended. If not (NO in step S715), the processing proceeds to step S704 and is repeated.

On the other hand, in step S720, the system control unit 50 presents the normal playback display on the display unit 28. The normal playback display is a display of the image without the 2-area enlargement information added thereto, and therefore the guide 812 is not displayed. Other than that, the processing in step S720 is similar to the processing in step S703.

Processing in steps S721 to S725 is similar to the processing in the above-described steps S711 to S715, and therefore a description thereof will be omitted here.

As described above, according to the present exemplary embodiment, the digital camera 100 presents the 2-area enlargement display as a method for confirming the image after the imaging, thereby allowing the user to further correctly confirm whether the horizontally established before the imaging is maintained.

Regarding the above-described various kinds of control that have been described assuming that the system control unit 50 performs them, a single hardware device may perform them, or a plurality of hardware devices may control the entire apparatus by dividing the processing among them.

Further, although the present disclosure has been described in detail based on the representative exemplary embodiments thereof, the present disclosure is not limited thereto, and includes various embodiments within a range that does not depart from the spirit of the present disclosure. Further, each of the above-described exemplary embodiments merely indicates one exemplary embodiment of the present disclosure, and the individual exemplary embodiments can also be combined arbitrarily.

Further, the above-described exemplary embodiments have been described referring to the example in which the present disclosure is applied to the digital camera 100, but the present disclosure is not limited to this example and can be applied to any imaging control apparatus capable of presenting the 2-area enlargement display. More specifically, the present disclosure can be applied to a personal computer and a personal digital assistant (PDA) having a camera function, a mobile phone terminal equipped with a camera and a mobile image viewer equipped with a camera, a music player equipped with a camera, a game machine equipped with a camera, and an electronic book reader equipped with a camera. Further, the present disclosure can be applied to a tablet terminal equipped with a camera, a smart-phone equipped with a camera, home electronics and an in-vehicle apparatus including a camera function and a display, and the like. Further, the present disclosure can also be applied to apparatuses such as a smart-phone, a tablet personal computer (PC), and a desktop PC that receive a live view image captured by a digital camera or the like via wired or wireless communication to display the received live view image, and remotely control the digital camera (including a network camera).

According to the above-described exemplary embodiments, the user can further easily confirm whether the image has been able to be captured with the camera orientation adjusted as intended.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation to encompass all such modifications and equivalent structures and functions.

This application claims the benefit of Japanese Patent Application No. 2016-254227, filed Dec. 27, 2016, which is hereby incorporated by reference herein in its entirety.

What is claimed is:

1. An imaging control apparatus comprising:
at least one memory and at least one processor which function as:
a display control unit configured to perform control to present a 2-area enlargement display of displaying live view images captured at two imaging regions of an imaging unit that are separated in a width direction or a height direction while juxtaposing them on a display unit; and
a control unit configured to perform control to, after an image is captured according to an imaging instruction issued while the live view images in the 2-area enlargement display are displayed, present a review display of a 2-area enlargement of displaying two regions of the captured image that are separated in the width direction or the height direction while juxtaposing them on the display unit,
wherein the two regions displayed in the review display of the 2-area enlargement are based on positions and magnification ratios of display ranges displayed in the 2-area enlargement display of the live view images immediately before the imaging.

2. The imaging control apparatus according to claim 1, wherein, if the imaging instruction is issued while the live view images in the 2-area enlargement display are not displayed, the control unit performs control to present a review display of entirely displaying the captured image on the display unit after the image is captured according to the imaging instruction.

3. The imaging control apparatus according to claim 1, the at least one memory and the at least one processor further function as a setting unit configured to set whether to present the review display of the 2-area enlargement,
wherein, if the imaging control apparatus is set not to present the review display of the 2-area enlargement by the setting unit, the control unit performs control to present a review display of entirely displaying the captured image even after the image is captured according to the imaging instruction issued while the live view images in the 2-area enlargement display are displayed.

4. The imaging control apparatus according to claim 1, wherein, when a predetermined time period has elapsed since a start of the review display of the 2-area enlargement, the control unit performs control to automatically switch the review display to a review display of entirely displaying the captured image.

5. The imaging control apparatus according to claim 1, wherein the control unit performs control to end the review display of the 2-area enlargement if a predetermined time period has elapsed with no operation performed since a start of the review display of the 2-area enlargement, and maintain the review display of the 2-area enlargement after the predetermined time period has elapsed when an operation regarding the displayed image is performed before the predetermined time period has elapsed since the start of the review display of the 2-area enlargement.

6. The imaging control apparatus according to claim 1, wherein, according to an operation from a user during the review display of the 2-area enlargement, the control unit performs control to switch the review display to a review display of entirely displaying the captured image.

7. The imaging control apparatus according to claim 1, the at least one memory and at least one processor further function as a selection unit configured to select one of the two regions in the 2-area enlargement display of the live view images,
wherein the display control unit performs control to present a display indicating which region is selected by the selection unit in the 2-area enlargement display of the live view images, and not to present the display indicating which region is selected between the two regions displayed while being juxtaposed in the review display of the 2-area enlargement.

8. The imaging control apparatus according to claim 1, wherein, if the image is captured according to the imaging instruction issued while the live view images in the 2-area enlargement display are displayed, the control unit performs control to record information indicating that the live view images in the 2-area enlargement display are displayed as attribute information of the captured image.

9. The imaging control apparatus according to claim 8, the at least one memory and at least one processor further function as a playback control unit configured to perform control to play back and display an image recorded in a recording medium,
wherein, if the information is recorded in the image to be played back as the attribute information, the playback control unit performs control to present a playback display as 2-area enlargement of displaying two regions of the image to be played back that are separated in the width direction or the height direction while juxtaposing them on the display unit.

10. An imaging control apparatus comprising:
at least one memory and at least one processor which function as:
a display control unit configured to perform control to present a 2-area enlargement display of displaying live view images captured at two imaging regions of an imaging unit that are separated in a width direction or a height direction while juxtaposing them on a display unit;

a control unit configured to perform control to, if an image is captured according to an imaging instruction issued while the live view images in the 2-area enlargement display are displayed, record information indicating that the live view images in the 2-area enlargement display are displayed as attribute information of the captured image; and a playback control unit configured to perform control to play back and display an image recorded in a recording medium, and perform control to present a playback display as 2-area enlargement of displaying two regions of the image to be played back that are separated in the width direction or the height direction while juxtaposing them on the display unit if the information is recorded in the image to be played back as the attribute information.

11. The imaging control apparatus according to claim 9, wherein the playback control unit performs control to display a guide indicating that the playback display of the 2-area enlargement can be presented together with the played-back image if the information is recorded in the image to be played back as the attribute information, and present the playback display of the 2-area enlargement if an instruction operation for presenting the playback display of the 2-area enlargement is performed by a user.

12. The imaging control apparatus according to claim 11, wherein the playback control unit performs control not to display the guide if the image is not recorded in the image to be played back as the attribute information.

13. The imaging control apparatus according to claim 10,
wherein the information includes information corresponding to positions of display ranges displayed in the 2-area enlargement display of the live view images immediately before the imaging, and wherein the playback control unit performs control to display two regions, at positions based on the information, in the image to be played back while juxtaposing them on the display unit, when the playback display of the 2-area enlargement is presented.

14. A method for controlling an imaging control apparatus, the method comprising:
performing control to present a 2-area enlargement display of displaying live view images captured at two imaging regions of an imaging unit that are separated in a width direction or a height direction while juxtaposing them on a display unit; and performing control to, after an image is captured according to an imaging instruction issued while the live view images in the 2-area enlargement display are displayed, present a review display of a 2-area enlargement of displaying two regions of the captured image that are separated in the width direction or the height direction while juxtaposing them on the display unit, wherein the two regions displayed in the review display of the 2-area enlargement are based on positions and magnification ratios of display ranges displayed in the 2-area enlargement display of the live view images immediately before the imaging.

15. A method for controlling an imaging control apparatus, the method comprising:
performing control to present a 2-area enlargement display of displaying live view images captured at two imaging regions of an imaging unit that are separated in a width direction or a height direction while juxtaposing them on a display unit;

performing control to, if an image is captured according to an imaging instruction issued while the live view images in the 2-area enlargement display are displayed, record information indicating that the live view images in the 2-area enlargement display are displayed as attribute information of the captured image; and performing control to play back and display an image recorded in a recording medium, wherein a playback display of 2-area enlargement of displaying two regions of the image to be played back that are separated in the width direction or the height direction while juxtaposing them on the display unit is presented if the information is recorded in the image to be played back as the attribute information.

16. A non-transitory computer-readable storage medium storing a program for causing a computer to execute a method according to claim 14.

17. A non-transitory computer-readable storage medium storing a program for causing a computer to execute a method according to claim 15.

18. An imaging control apparatus comprising:
at least one memory and at least one processor which function as:
a display control unit configured to perform control to present a 2-area enlargement display of displaying live view images captured at two imaging regions of an imaging unit that are separated in a width direction or a height direction while juxtaposing them on a display unit;

a control unit configured to perform control to, after an image is captured according to an imaging instruction issued while the live view images in the 2-area enlargement display are displayed, present a review display of a 2-area enlargement of displaying two regions of the captured image that are separated in the width direction or the height direction while juxtaposing them on the display unit; and a setting unit configured to set whether to present the review display of the 2-area enlargement, wherein, if the imaging control apparatus is set not to present the review display of the 2-area enlargement by the setting unit, the control unit performs control to present a review display of entirely displaying the captured image even after the image is captured according to the imaging instruction issued while the live view images in the 2-area enlargement display are displayed.

19. An imaging control apparatus comprising:
at least one memory and at least one processor which function as:
a display control unit configured to perform control to present a 2-area enlargement display of displaying live view images captured at two imaging regions of an imaging unit that are separated in a width direction or a height direction while juxtaposing them on a display unit; and a control unit configured to perform control to, after an image is captured according to an imaging instruction issued while the live view images in the 2-area enlargement display are displayed, present a review display of a 2-area enlargement of displaying two regions of the captured image that are separated in the width direction or the height direction while juxtaposing them on the display unit, wherein, when a predetermined time period has elapsed since a start of the review display of the 2-area enlargement, the control unit performs control to automatically switch the review display to a review display of entirely displaying the captured image.

20. An imaging control apparatus comprising:
at least one memory and at least one processor which function as:
a display control unit configured to perform control to present a 2-area enlargement display of displaying live view images captured at two imaging regions of an imaging unit that are separated in a width direction or a height direction while juxtaposing them on a display unit; and
a control unit configured to perform control to, after an image is captured according to an imaging instruction issued while the live view images in the 2-area enlargement display are displayed, present a review display of a 2-area enlargement of displaying two regions of the captured image that are separated in the width direction or the height direction while juxtaposing them on the display unit,
wherein the control unit performs control to end the review display of the 2-area enlargement if a predetermined time period has elapsed with no operation performed since a start of the review display of the 2-area enlargement, and maintain the review display of the 2-area enlargement after the predetermined time period has elapsed when an operation regarding the displayed image is performed before the predetermined time period has elapsed since the start of the review display of the 2-area enlargement.

21. An imaging control apparatus comprising:
at least one memory and at least one processor which function as:
a display control unit configured to perform control to present a 2-area enlargement display of displaying live view images captured at two imaging regions of an imaging unit that are separated in a width direction or a height direction while juxtaposing them on a display unit; and
a control unit configured to perform control to, after an image is captured according to an imaging instruction issued while the live view images in the 2-area enlargement display are displayed, present a review display of a 2-area enlargement of displaying two regions of the captured image that are separated in the width direction or the height direction while juxtaposing them on the display unit,
wherein, according to an operation from a user during the review display of the 2-area enlargement, the control unit performs control to switch the review display to a review display of entirely displaying the captured image.

22. A method for controlling an imaging control apparatus, the method comprising:
performing control to present a 2-area enlargement display of displaying live view images captured at two imaging regions of an imaging unit that are separated in a width direction or a height direction while juxtaposing them on a display unit;
performing control to, after an image is captured according to an imaging instruction issued while the live view images in the 2-area enlargement display are displayed, present a review display of a 2-area enlargement of displaying two regions of the captured image that are separated in the width direction or the height direction while juxtaposing them on the display unit; and
setting whether to present the review display of the 2-area enlargement,
wherein, if the imaging control apparatus is set not to present the review display of the 2-area enlargement, performing control to present a review display of entirely displaying the captured image even after the image is captured according to the imaging instruction issued while the live view images in the 2-area enlargement display are displayed.

23. A method for controlling an imaging control apparatus, the method comprising:
performing control to present a 2-area enlargement display of displaying live view images captured at two imaging regions of an imaging unit that are separated in a width direction or a height direction while juxtaposing them on a display unit; and
performing control to, after an image is captured according to an imaging instruction issued while the live view images in the 2-area enlargement display are displayed, present a review display of a 2-area enlargement of displaying two regions of the captured image that are separated in the width direction or the height direction while juxtaposing them on the display unit,
wherein, when a predetermined time period has elapsed since a start of the review display of the 2-area enlargement, performing control to automatically switch the review display to a review display of entirely displaying the captured image.

24. A method for controlling an imaging control apparatus, the method comprising:
performing control to present a 2-area enlargement display of displaying live view images captured at two imaging regions of an imaging unit that are separated in a width direction or a height direction while juxtaposing them on a display unit; and
performing control to, after an image is captured according to an imaging instruction issued while the live view images in the 2-area enlargement display are displayed, present a review display of a 2-area enlargement of displaying two regions of the captured image that are separated in the width direction or the height direction while juxtaposing them on the display unit,
performing control to end the review display of the 2-area enlargement if a predetermined time period has elapsed with no operation performed since a start of the review display of the 2-area enlargement, and maintain the review display of the 2-area enlargement after the predetermined time period has elapsed when an operation regarding the displayed image is performed before the predetermined time period has elapsed since the start of the review display of the 2-area enlargement.

25. A method for controlling an imaging control apparatus, the method comprising:
performing control to present a 2-area enlargement display of displaying live view images captured at two imaging regions of an imaging unit that are separated in a width direction or a height direction while juxtaposing them on a display unit; and
performing control to, after an image is captured according to an imaging instruction issued while the live view images in the 2-area enlargement display are displayed, present a review display of a 2-area enlargement of displaying two regions of the captured image that are separated in the width direction or the height direction while juxtaposing them on the display unit, wherein, according to an operation from a user during the review display of the 2-area enlargement, performing control to switch the review display to a review display of entirely displaying the captured image.

26. A non-transitory computer-readable storage medium storing a program for causing a computer to execute a method according to claim 22.

27. A non-transitory computer-readable storage medium storing a program for causing a computer to execute a method according to claim 23.

28. A non-transitory computer-readable storage medium storing a program for causing a computer to execute a method according to claim 24.

29. A non-transitory computer-readable storage medium storing a program for causing a computer to execute a method according to claim 25.

* * * * *